US008281244B2

(12) United States Patent
Neuman et al.

(10) Patent No.: US 8,281,244 B2
(45) Date of Patent: Oct. 2, 2012

(54) USER INTERFACE FOR MEDIA PLAYBACK

(75) Inventors: Michael Neuman, San Francisco, CA (US); William Martin Bachman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 535 days.

(21) Appl. No.: 12/482,994

(22) Filed: Jun. 11, 2009

(65) Prior Publication Data

US 2010/0318928 A1    Dec. 16, 2010

(51) Int. Cl.
*G06F 3/00* (2006.01)
*G06F 3/01* (2006.01)

(52) U.S. Cl. ........ 715/716; 715/810; 715/817; 715/818; 715/834; 715/835; 715/839

(58) Field of Classification Search .................. 715/716, 715/810, 817, 818, 834, 835, 839
See application file for complete search history.

(56) References Cited

U.S. PATENT DOCUMENTS

| 5,499,330 | A | 3/1996 | Lucas et al. | |
|---|---|---|---|---|
| 5,621,874 | A | 4/1997 | Lucas et al. | |
| 5,977,974 | A | 11/1999 | Hatori et al. | |
| 6,973,628 | B2 | 12/2005 | Asami | |
| 7,398,477 | B2 | 7/2008 | Accot | |
| 2005/0091596 | A1* | 4/2005 | Anthony et al. | 715/712 |
| 2007/0088748 | A1 | 4/2007 | Matsuzaki et al. | |
| 2007/0120856 | A1* | 5/2007 | De Ruyter et al. | 345/440 |
| 2007/0182741 | A1* | 8/2007 | Chosokabe | 345/440 |
| 2008/0025646 | A1* | 1/2008 | Aguera y Arcas et al. | 382/305 |
| 2008/0148179 | A1 | 6/2008 | Sloo | |
| 2008/0165136 | A1 | 7/2008 | Christie et al. | |
| 2008/0194276 | A1* | 8/2008 | Lin et al. | 455/466 |
| 2009/0063971 | A1 | 3/2009 | White et al. | |

FOREIGN PATENT DOCUMENTS

| EP | 1051034 A1 | 11/2000 |
|---|---|---|
| EP | 1148412 A2 | 10/2001 |
| EP | 2112594 A2 | 10/2009 |
| WO | WO 2010/138360 A1 | 12/2010 |

OTHER PUBLICATIONS

Miller, M., "Using Microsoft Windows media Player 11", 2006, Que, pp. 14, 20, 36, 42-45.*
Soper, M. E., "Using Microsoft Windows Media Center", 2008, Que, pp. 190-191.*
Florian Kleedorfer, Ulf Harr and Brigitte Krenn "Making Large Music Collections Accessible using Enhanced Metadata and Lightweight Visualizations," Third International Conference on Automated Production of Cross Media Content for Multi-Channel Distribution (AXMEDIS'07), Barcelona, Spain, Nov. 28-Nov. 30, 2007, pp. 138-144, IEEE Computer Society, Washington, DC.

* cited by examiner

*Primary Examiner* — Mark Rinehart
*Assistant Examiner* — Claudia Dragoescu
(74) *Attorney, Agent, or Firm* — Schwegman Lundberg & Woessner, P.A.

(57) ABSTRACT

A graphical user interface made up of icons representing individual files and collectively forming the shape of a spiral is described along with methods of using and creating the graphical user interface. The spiral interface is useful to display detailed information about many of the items in a list and facilitates manipulation of list order and selection of the active file in the list. The interface further permits the use of a representative icon associated with the list as a whole.

35 Claims, 23 Drawing Sheets

USER INTERFACE FOR MEDIA PLAYBACK

TECHNICAL FIELD

The present disclosure relates to graphical user interface for presenting a list and more specially a graphical user interface for presenting a media list.

INTRODUCTION

Even as computer processors are becoming faster and programs more capable, space on computer displays continues to be limited. As programs become more complex there is a need to display more information in the same limited space.

Displaying additional information is not the only challenge; program application developers are also challenged to present information in a visually appealing and easily useable way. Lists and icons have long been key elements in achieving these objectives, but while they represent simple ways to present information, they are not sufficiently appealing to consumers and fail to convey enough information to a user. Early lists using icons represented items in a list with a generic icon and a descriptive name, a file name. The generic icons conveyed very little information; usually they represented a filing folder in place of a directory folder and a file type for a file.

Today, lists and icons have come further. Commonly, icons display information specific to a particular file, rather than a group of files opened by the same application. These icons are commonly referred to as representing a snap shot of the contents of the actual file. However, to fit the icons into a conventional list they must be very small. Therefore, while these icons are capable of displaying much more information than their predecessors, sometimes they fail to do even that because they are so small that it is difficult to discern any useful information at all.

To solve this problem, new graphical user interfaces have been created which show lists with much larger icons. The tradeoff is that fewer items in the list are displayed. In one example, a list is displayed as a sort of Rolodex, as seen in FIG. 1. In this example the icons are sufficiently large so that they are easy to see and they successfully convey detailed information about the individual file, but the list as a whole displays less information. The interface allows a user to see detailed information about a selected file and some information about one to two files before and after the selected file. It does not display much, if any information about the other files in the list. Accordingly a method for displaying a list with a large number of icons of a sufficient size to be capable of conveying detailed information about each file and the list as a whole is needed.

SUMMARY

Additional features and advantages of the concepts disclosed herein are set forth in the description which follows, and in part may be apparent to a person of ordinary skill based on the description, or may be learned by practice of the described technologies. The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

The present disclosure describes methods and arrangements for manipulating a playlist by providing a graphical user interface in the form of a receding spiral made up of a collection of icons representing media items in the playlist having an icon in the center of the spiral representing the entire playlist. By way of selecting and dragging a representation of a media item or playlist into the center of the receding spiral, a new receding spiral based on the media item or playlist currently in the center of the spiral is created and displayed.

The new receding spiral can be generated based on a playlist created using similarity data related to the new media item in the center of the spiral, whereby the media items in the playlist are considered similar to the new media item. Alternatively, the new playlist can already be associated with the representation that was dragged into the center of the spiral.

In some embodiments, the representation of a media item that is dragged into the center of the spiral originates from outside the spiral. In such embodiments the representation can originate within a file or music management application. The representation can also originate from within a file directory.

The icons representing the media items in the playlist can be derived from album art or they can be generic icons. In some embodiments the representation in the center of the spiral can also be derived from album art from which the list is derived using similarity data. In some embodiments the representation in the center of the spiral can be an icon representing the playlist, which can be generic or assigned by a user.

In some embodiments a method for manipulating a playlist includes providing a graphical user interface in the form of a receding spiral made up of a collection of icons representing media items in the playlist. Further, an icon can be provided in the center of the spiral, which can represent the entire playlist. The graphical user interface can receive inputs representative of a selection and movement of least one of the icons representing media items in the playlist, and can rearrange the playlist according to the new position of at least one of the icons and responsively updating the graphical user interface.

In some embodiments a computer-readable medium having computer-readable program code for organizing a playlist into a graphical user interface for management of the playlist by a user is provided. The method carried out by the program can include mapping graphical representations of at least some items in a playlist to locations on a virtual display wherein the collective graphical representations of the items comprises a receding spiral and displaying the contents of the virtual display on a display device. Further the method can include detecting a selection action representative of selecting at least one of the graphical representations and detecting a move action representative of relocating the position of the selected at least one graphical representation, which can be interpreted to command the reordering of the playlist based on the relocated position of the at least one graphical representation.

In some embodiments a move operation can be illustrated in the graphical user interface by continuing to display the graphical representation or icon in its present position as it is moved around the graphical user interface. In doing so, the potential new organization of the playlist can be displayed. The new organization can take place once the move operation is completed or a new potential arrangement can be shown if the move operation continues.

Further, in some embodiments, a method for managing a playlist in a graphical user interface is provided wherein the method can include generating a relative ordering for a list of digital files and displaying the files in a graphical user interface comprising respective graphical icons for each digital file, the respective graphical icons positioned for maintaining the relative ordering of the list and can collectively produce a spiral pattern. Further the method can include graphically distinguishing the icon for a currently active digital file, and updating the spiral pattern based on a change in the currently active digital file to maintain each then-currently active digital file in approximately a constant location, while previously currently active digital files are segregated from to-be-active digital files by the icon for the currently active digital file. Further the method can accept digital file sequence manipulation input from the graphical user interface and based on the sequence manipulation input, generate a different ordering for the list of digital files.

Additionally, the step of updating can include an animation sequence to illustrate the change in the currently active digital file such as animation illustrating the spiral rotating the new currently active digital file into the approximately constant location designated for the currently active file.

Further, in some embodiments the method includes the step of displaying an icon in the center of the spiral pattern that is not part of the spiral itself, which represents the entire list. If the icon in the center of the spiral pattern is replaced with a graphical representation of a new digital file a new list can be created. In one example, the new list is created based on similarity data associated with the new digital file.

Further, new items can be added to the spiral and underlying playlist. Graphical representations of the new digital file can be selected from outside of the spiral from sources such as a media management software or a file system structure. The new digital file can be inserted into the list in the same relative position as the position that the graphical representation of the new digital file was inserted into the spiral relative to the other files already in the list.

As can be appreciated from the above, and can further be appreciated from the detailed description and discussion of the drawings, the embodiments described herein provide for a more efficient way of managing a digital list. Users can view and arrange and rearrange a great number of items in a list. Further, users can create a new list using one drag operation. Efficiencies can be gained at the processor too. A processor can create a new list from a file relocated to an area on the screen.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

DETAILED DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 2:
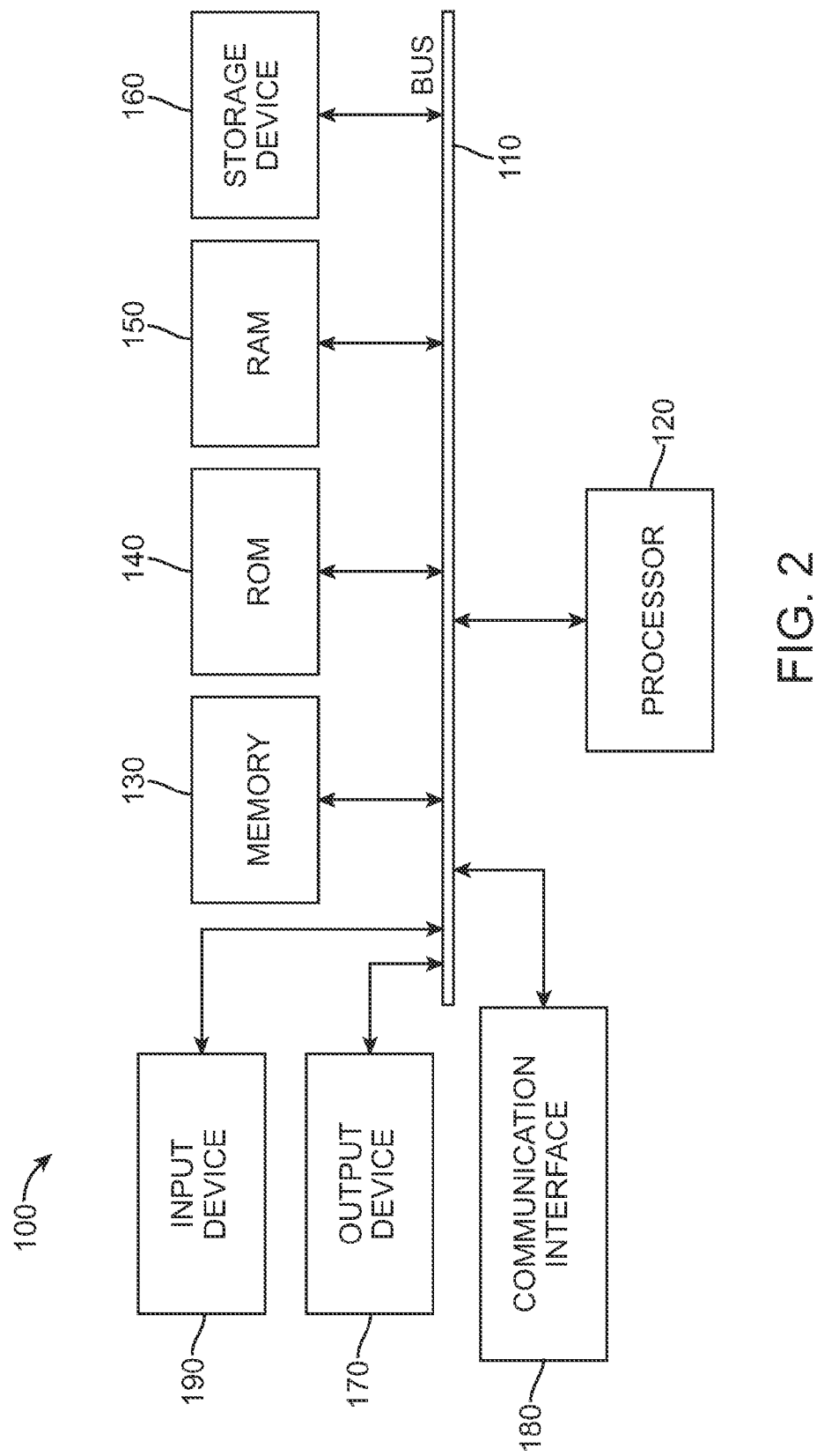
FIG. 2 illustrates an example system embodiment.

With reference to FIG. 2, a general-purpose computing device 100 which can be portable or stationary is shown, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. For example, video output or audio output devices which can be connected to or can include displays or speakers are common. Additionally, the video output and audio output devices can also include specialized processors for enhanced performance of these specialized functions. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may be substituted for improved hardware or firmware arrangements as they are developed.

Figure 1:
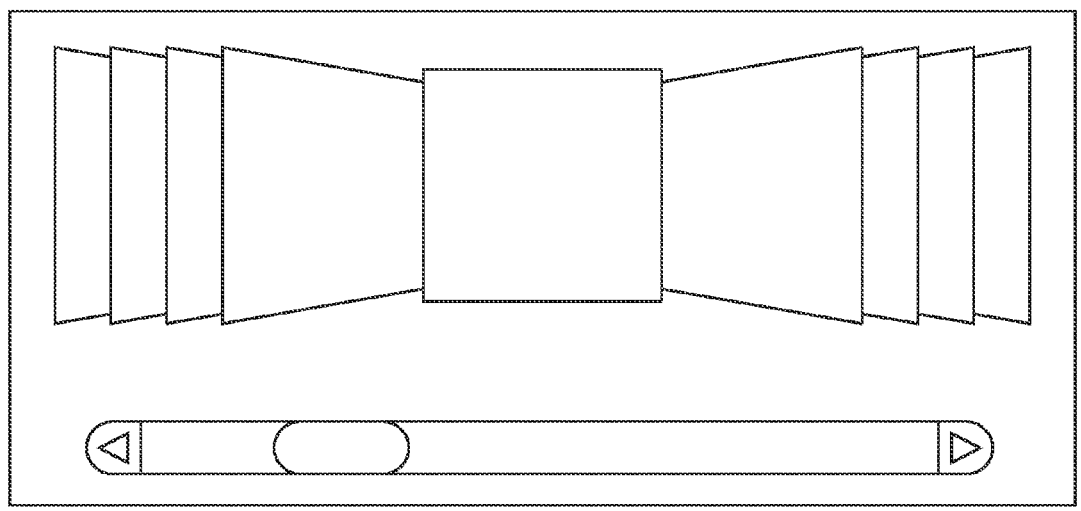
FIG. 1 illustrates a prior art embodiment.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments may be implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

The present system and method is particularly useful for generating and displaying and manipulating a list of digital items in a graphical user interface. The graphical user interface makes use of the perception of 3-D space on a display device to convey detailed information about a specific file and information about the file in the context of a list.

Figure 3:
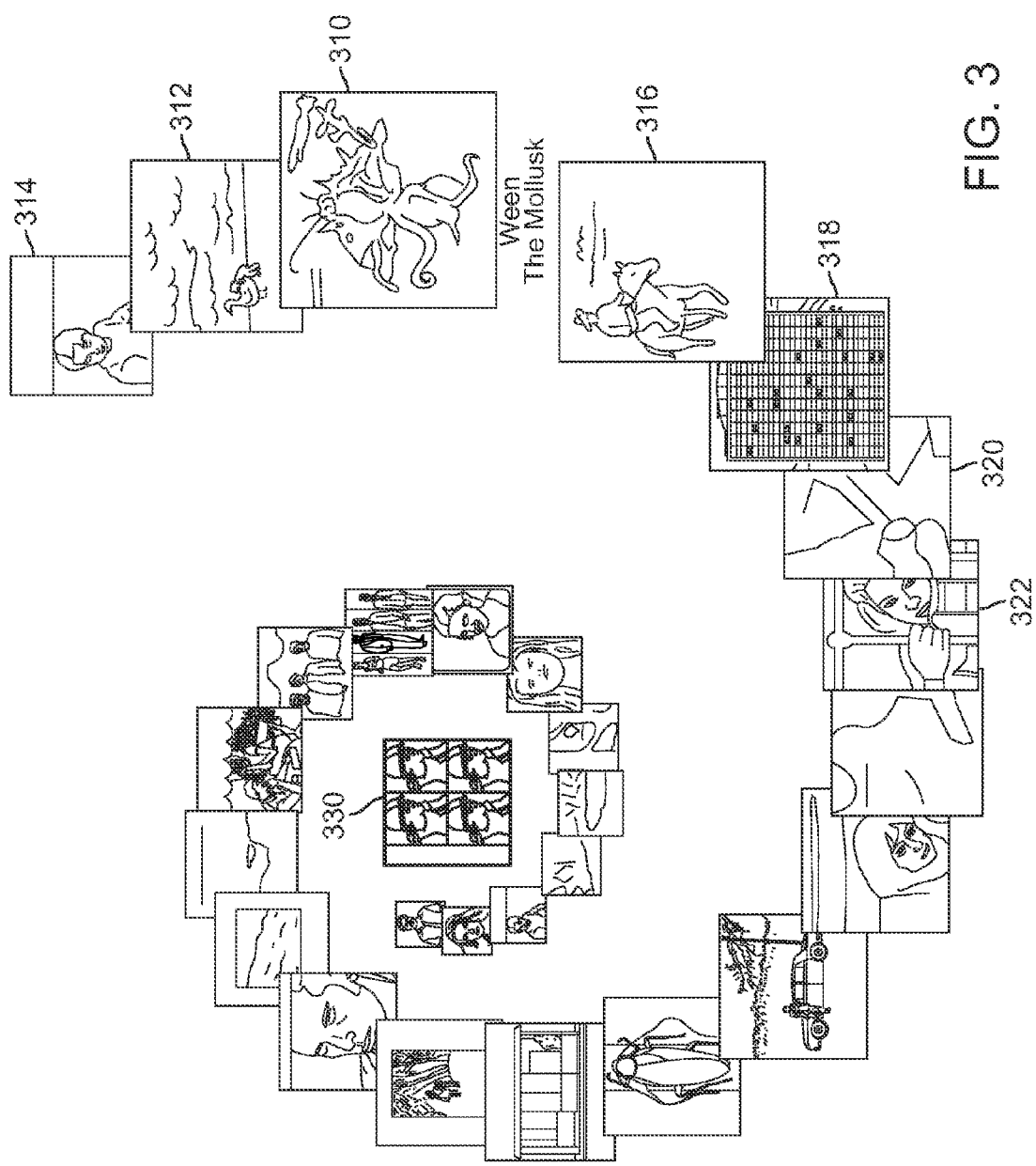
FIG. 3 illustrates an example graphical user interface embodiment.

FIG. 3 illustrates one example of a graphical user interface. An ordered list is displayed as a receding spiral in a virtual 3-D space. Each item has a position on the screen as represented by X, Y and Z Cartesian coordinates. In general, in this embodiment, icons that appear larger, have a lower value on the Z-axis, are more proximate to the currently active file 310. The active file 310 being the largest and present in the foreground of the GUI.

An active file can be a file that is presently opened or in use, but in some embodiments can simply be a file that is selected by the user. Icons 312 and 314 represent files that were previously active, but now are considered to be in the past. Icon 312 appears larger because it was the previous file to be active, while icon 314 was active before 312. In this way the sizes and positions of respective the icons along the Z-axis inform the user of each file's placement in the list. In this case 314 was active first, 312 second, and 310 is currently active.

Likewise the GUI also shows the relative positions of those files that are in line to be the active file in the future. Icons 316, 318, 320 and 322 represent files that have yet to become active. In other words they are next in the list. Just as with the previously active items, 316 is larger and has a lower value on the Z-axis and is therefore represented as being the next file in the list. Following 316 is 318, then 320 and 322 and so on.

In this FIG., the only icon that does not follow the trend of appearing in a size and position relative to its position in the list is icon 330. As illustrated 330 does appear smaller and further back in space than icon 310 and perhaps 316, but otherwise appears in this example that it could be the same size and have the same Z-axis value as other items in the list. This item therefore does not follow the usual trend in the list, but this is because it is not a part of the ordered list. Icon 330 represents the list.

In some embodiments 330 could be an icon of the folder that contains each of the files in the list represented in the receding spiral. Icon 330 can also represent a particular file that is representative of the list. In some embodiments, icon 330 can represent a music playlist file and the icons in the receding spiral are the items in the playlist.

Icon 330 can also be a song or other media file from which a playlist is generated automatically, for example by using similarity data. Similarity data is data that identifies other items as similar. One example of similarity data is known as GENIUS and is part of Apple Inc.'s (of Cupertino, Calif.) media management software ITUNES.

Figure 4:
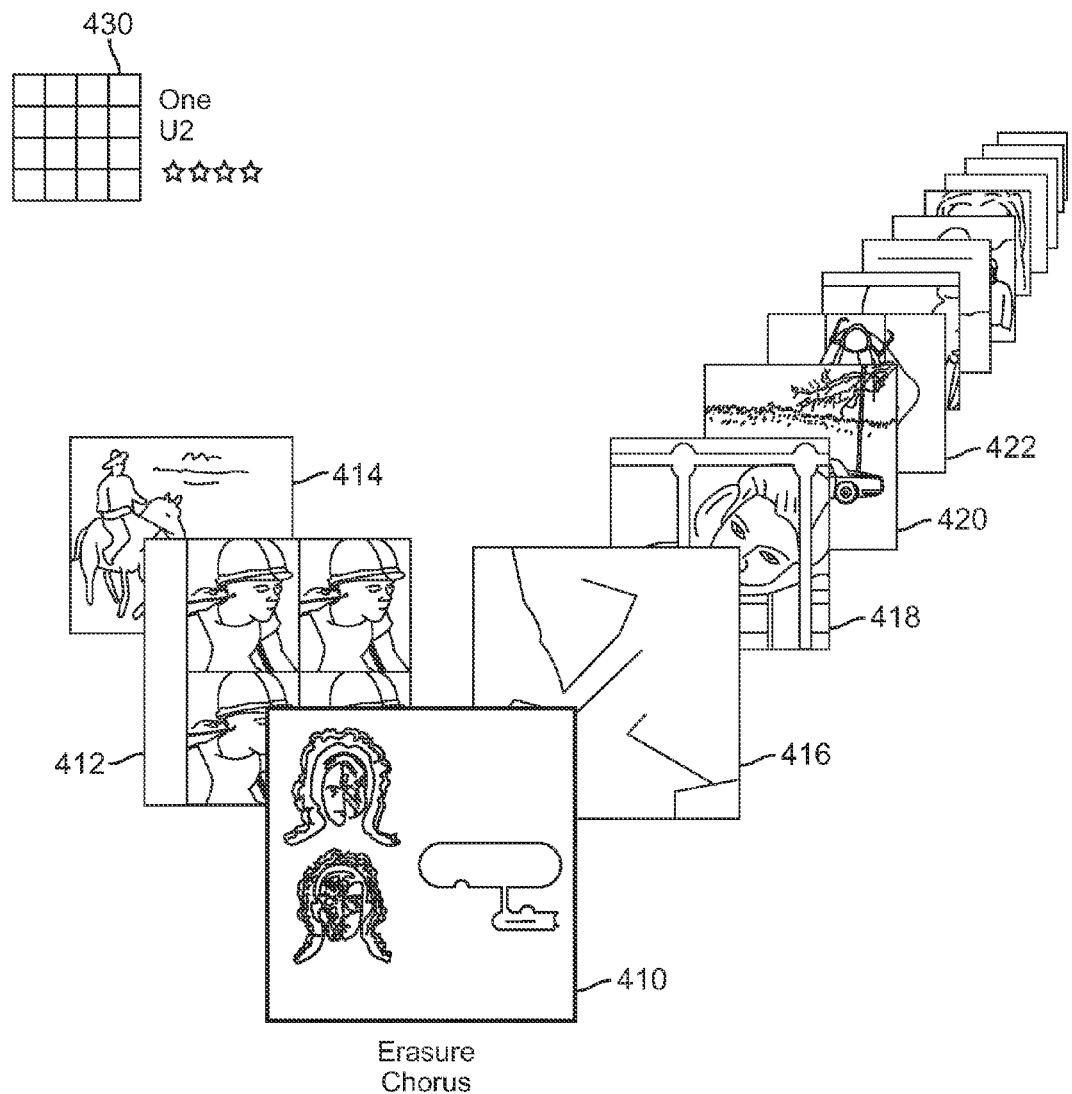
FIG. 4 illustrates an example graphical user interface embodiment.

FIG. 4 illustrates another potential graphical user interface. In this FIG., the GUI is v-shaped, with the arms of the "v" receding into space from their meeting point. The junction of the two arms of the "v" is represented by icon 410 and is the currently selected or playing item. Items 412 and 414 are previously played items and items 416, 418, 420 and 422 have yet to play.

Just as with the spiral-shaped GUI, the GUI comprising a v-shaped pattern also reserves a space for a generic icon labeled 430 in FIG. 4.

Figure 5:
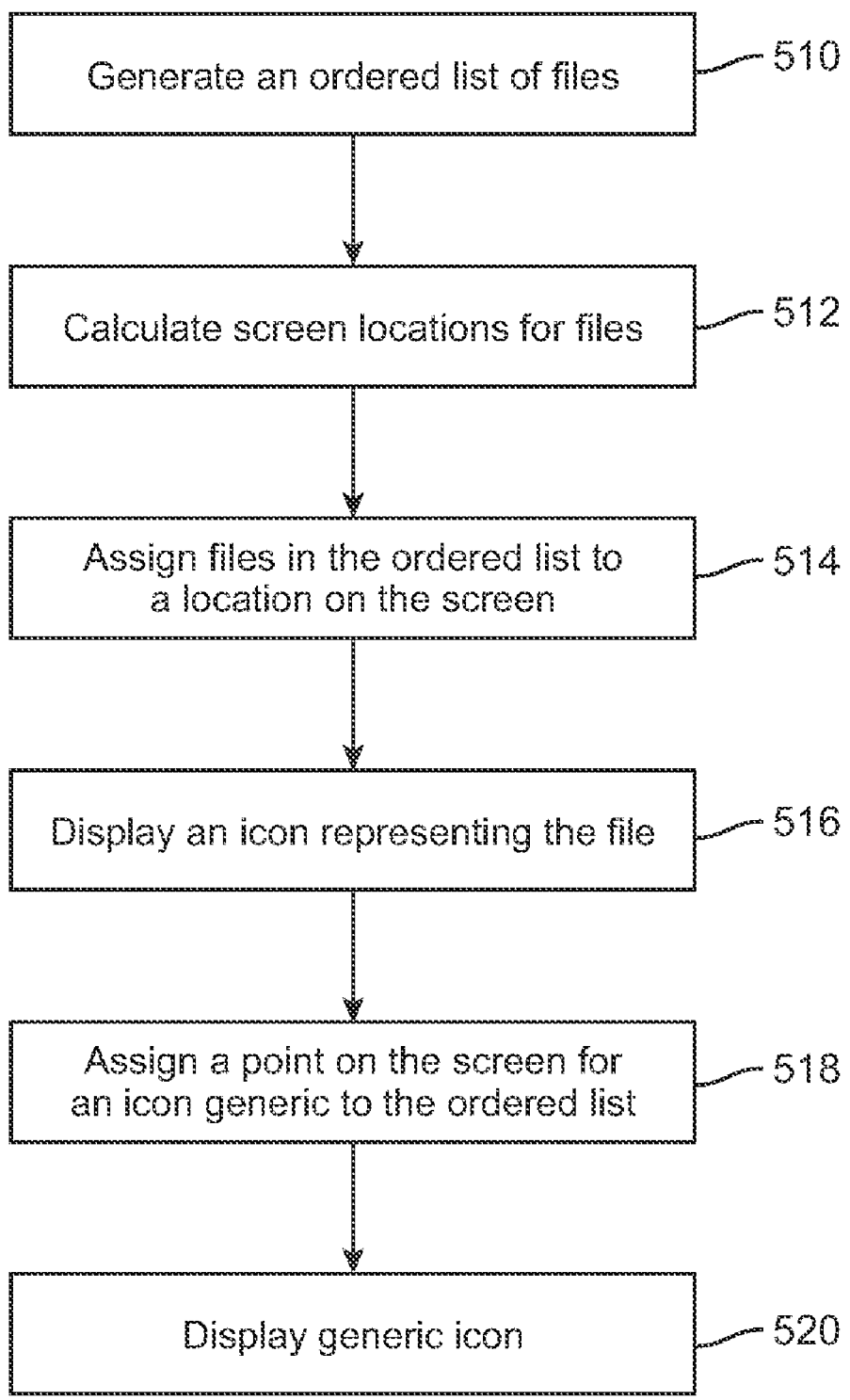
FIG. 5 illustrates a method embodiment.

FIG. 5 illustrates a method of generating and managing a graphical user interface as described throughout this application. In step 510, an electronic device generates an ordered list of files. The device need not generate the list from scratch every time the list is to be displayed. In cases such as music playlists that already have an ordered list of files, the electronic device need only open the playlist and does not create it from scratch, although the method comprises this embodiment too.

In step 512 an electronic device calculates the screen locations for files in the ordered playlist. In some embodiments, step 512 comprises deciding how many items will be displayed, and in some embodiments the number of items to be displayed is a fixed number. Alternatively, all items in the list can be displayed. In such a case the items in the list will appear to continue into infinity and the latest items in the list might not be independently discernable.

Taking the embodiment wherein the number of items to be displayed must be determined, an algorithm can analyze the total number of items in a list and based on the available area on the display the algorithm can determine the number of items that can be displayed while still allowing the most proximate icons to be of sufficient size to be easily viewable.

Regardless of the number of items to be displayed, the algorithm next maps the files to be displayed in the ordered list to the available screen locations in step 514 and displays an icon representing the file in step 516. Each screen location is identified by X, Y and Z Cartesian coordinates designating the point on the screen that an icon representing a file in the list should be placed. See for example FIGS. 6 and 7. Here the currently playing items 610, 710 are mapped to a point (X1, Y1, Z1), which represents the placement of a corner of an icon. In these figures, X and Y represent the placement of the top left corner of the icon and Z represents the items Z score. The currently playing item will usually have the lowest Z score of any item in the interface, which corresponds to the foreground. Higher Z scores correspond to items moving progressively further into the background.

The pattern as a whole can be created by first calculating the shape of the pattern, for example, a spiral. The exact spiral pattern shape may be unimportant as long as it allows for a sufficient number of items to be seen, and if desired, the spiral should leave enough room in the center for a generic icon. It is contemplated that the method for calculating the shape of the spiral may be left to the programmer of the algorithm to be carried out on a computer processor, but the algorithm is not limited to only one shape or even one way of calculating the shape. By way of example only, a spiral can be a logarithmic spiral ($r=ab^\theta$) (Fibonacci spiral and golden spiral are examples), or an Archimedean spiral ($r=a+b\theta$), Fermat's spiral ($r=\theta^{1/2}$), hyperbolic spiral ($r=a/\theta$), lituus ($r=\theta^{-1/2}$) or any other spiral form, known in the art or heretofore determined.

Figure 6:
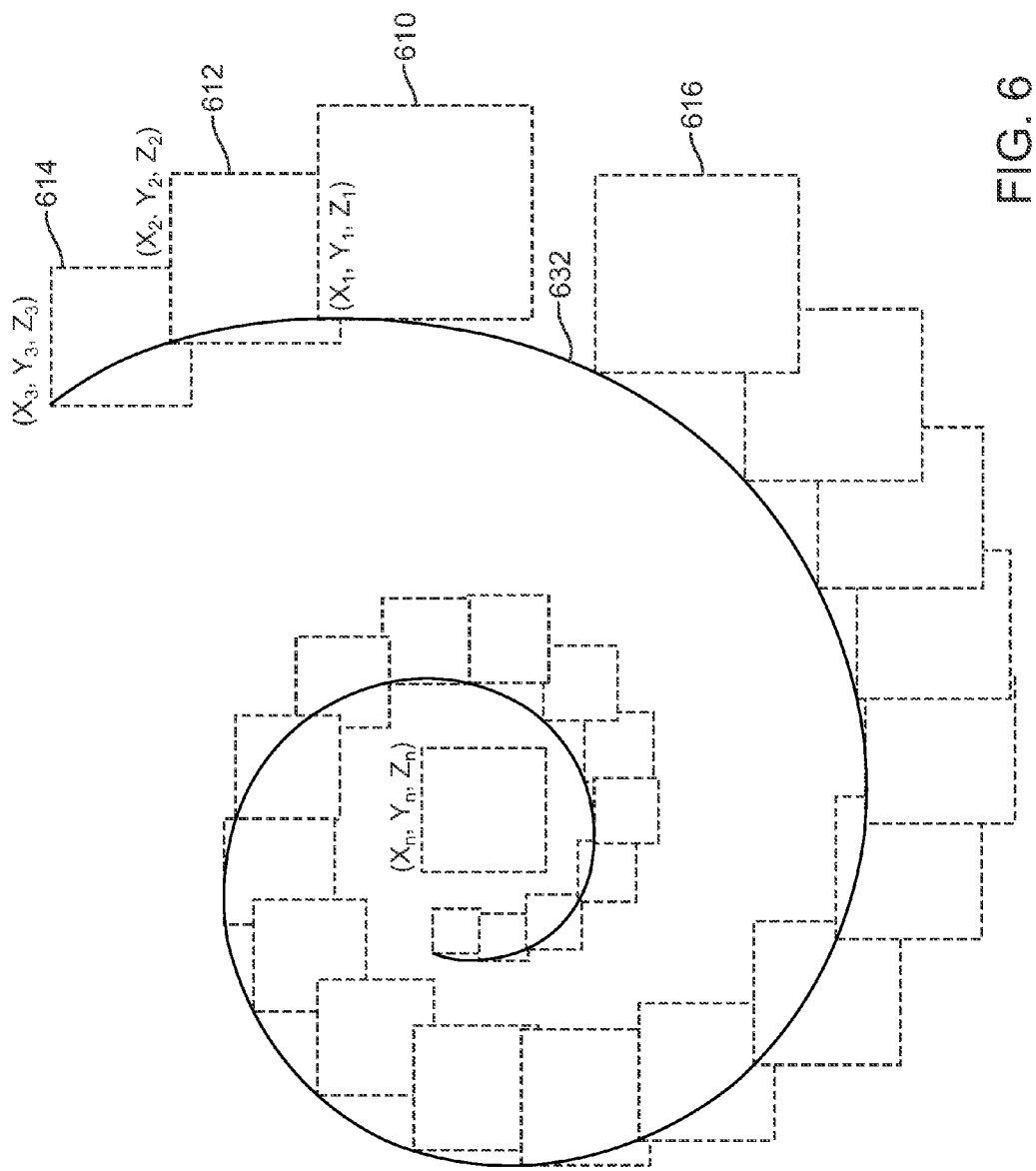
FIG. 6 illustrates a graphical user interface construction embodiment.
Figure 7:
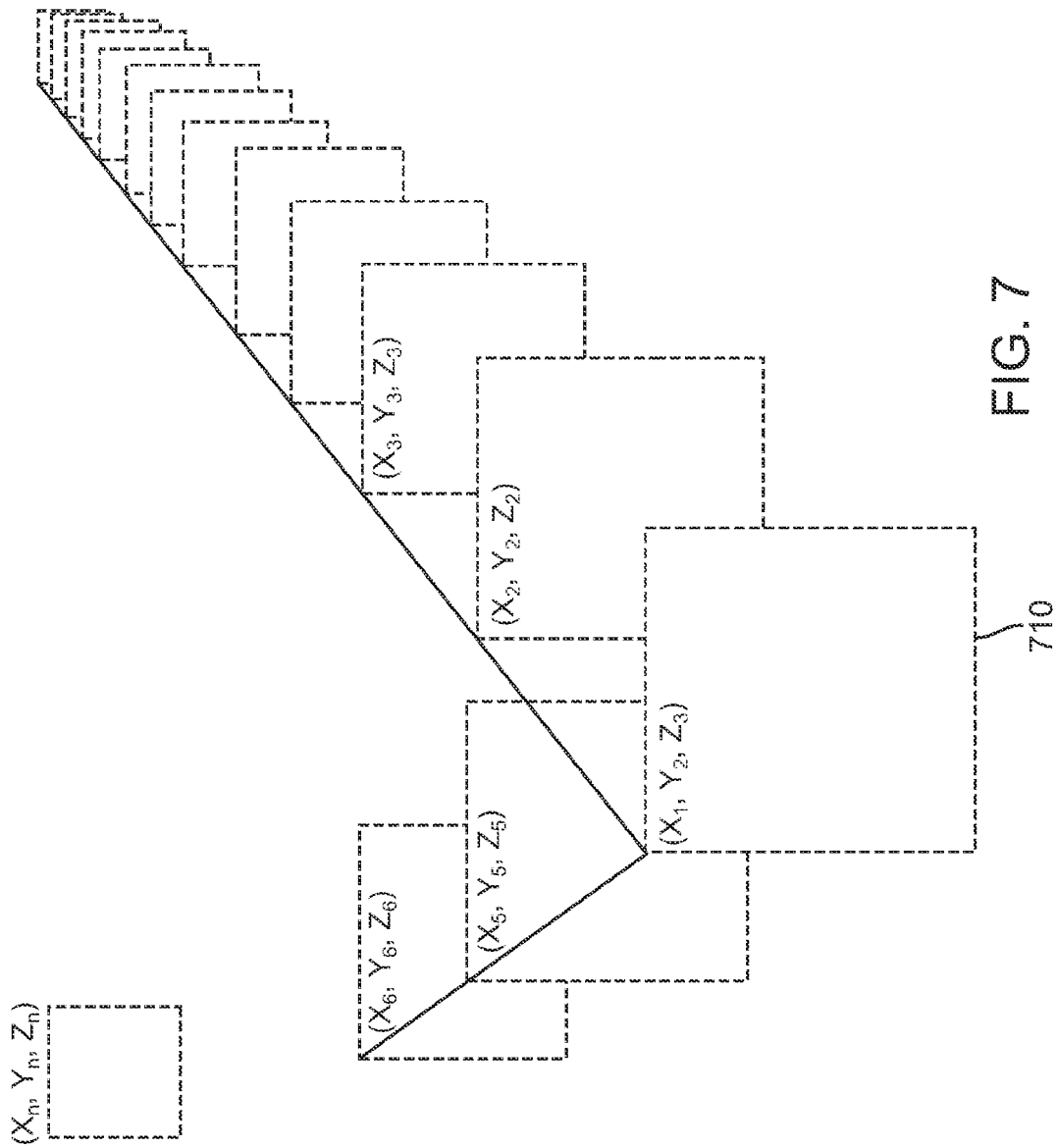
FIG. 7 illustrates a graphical user interface construction embodiment.

The spiral itself need not be displayed on the screen. However, the X and Y coordinates of the corner of each icon, or any consistent point of the icons, should be points that make up the undrawn spiral. See for example FIG. 6, 632 represents the undrawn spiral. The top left corner of each of the icons 610, 612, 614, 616 falls squarely on the spiral pattern. By this method the icons are arranged in such a way that they portray a spiral pattern.

The size of the icons is related to the position of the item the icon represents in the list. The actively selected or open file is the largest icon. The computer processor can identify the icon as being a certain number of pixels in the X-axis from the point in the spiral and a certain number of pixels in Y-axis from the point on the spiral. By way of example, icon 610 having its upper left corner at position X1, Y1 could have its lower right corner at X1415, Y1-15 if 610 were to be square shaped having a side of 15 pixels. Other sizing methods are also possible. For example, if each icon's native size is the same, then the computer processor can also just represent each icon as a certain percentage of its original size. Additionally, other mechanisms for identifying a point for location of an icon and its size on a screen are well known and within the level of skill in the art.

Other shapes are also suitable for use and can be generated in much the same method as the spiral embodiments described above. A shape is calculated or virtually drawn and locations are chosen along the shape for placement of the icons as is known.

Referring once again to FIG. 5, in some embodiments the algorithm will also assign a point on the screen for an icon that is generic to the entire list, or that represents the entire list in step 518 and displays the generic icon in step 520. Examples of these icons are icons that represent a folder that contains the items in the list or a song that was used as a seed song to create the playlist.

In operation, the active item will continuously change. This is especially true in a music playlist scenario. Once the active item finishes playing, the next song in the list will become the active item. As seen in FIG. 3, 310 is the active item. In this embodiment, the active item will always be in this location. Therefore when item 316, becomes the active item each item will shift position to represent its new position in the list. For example 310 will move to the location of 312, 312 to 314, 316 to 310 etc. In some embodiments this will be represented by animation, showing the spiral rotating position. Alternatively, the icons can simply change to the new representations.

In certain instances, an icon will not occupy all available screen locations. Using a music playlist by way of example, when the first song in the playlist is playing (active), there are no past items and therefore none will be displayed until the playlist has progressed to have songs to display as past songs.

Figure 8:
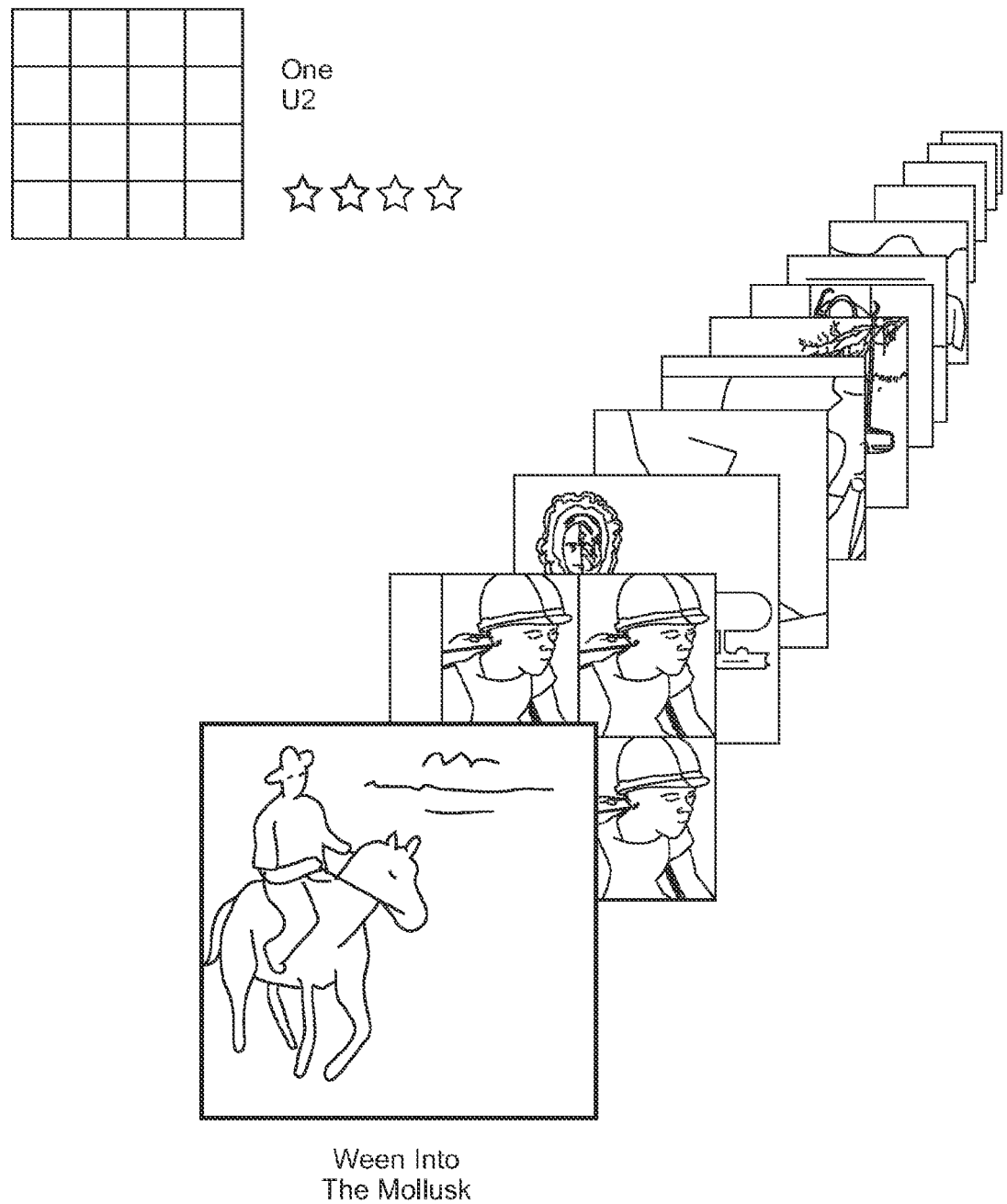
FIG. 8 illustrates a graphical user interface embodiment.

Likewise, if a playlist has almost reached the last items in the playlist, there will not be enough songs to fill all slots and much of the spiral pattern will not have future items displayed. This is illustrated in FIG. 8 wherein only the first item in the list is active and there are no previously viewed or played items to make up the left arm of the "V". Alternatively, all screen locations can also be occupied by showing a greater number of previously played items.

In some embodiments it is useful to mark unoccupied screen locations with placeholders. The placeholders can be for example an ellipsis ( . . . ) or a blank box or any other designation of a screen location that could be occupied.

Figure 9:
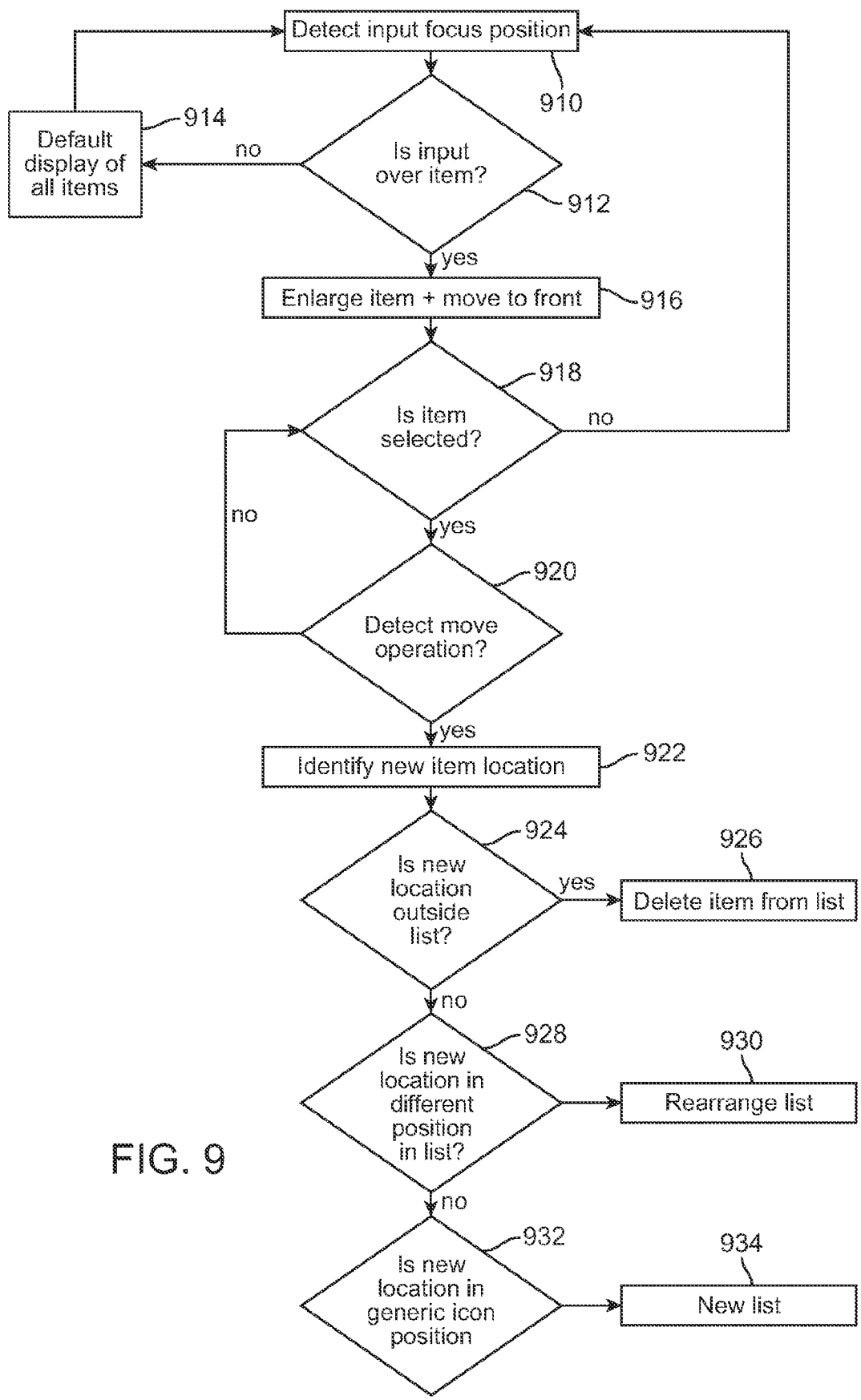
FIG. 9 illustrates a method embodiment.

By organizing the graphical user interface to have the appearance of a 3-D pattern, many more items in a list can be visualized and manipulated. Not only can the items in a list be clearly viewed, a user can work with the items to rearrange or otherwise modify the list. FIG. 9 illustrates one method for working with the items in a list. Starting at 910, the input focus position is detected and in step 912 the input's position relative to an item in the list is determined.

The input can be a mouse or other pointer device, or touch interface, or pen based contact pointer. In some embodiments the input focus position can be detected and the system will represent the input focus position with a graphical indication such as a pointer. In some embodiments, the input focus position is not represented on the screen, but instead the user can directly interact with the screen portion using a touch input gesture such as a tap or swipe or drag or other touch input. In direct input embodiments a touch of the screen can operate the same as if a pointer device were positioned over the icons in the list. For example the system can perform the same functions if a user were to either tap an icon on the screen or touch and hold an icon on the screen as if a user performed the analogous operation using a mouse pointer device. In some embodiments, since a touch input is directly into the graphical user interface rather than into a peripheral device such as a mouse, a pointer may not be necessary to perform certain functions.

Figure 10:
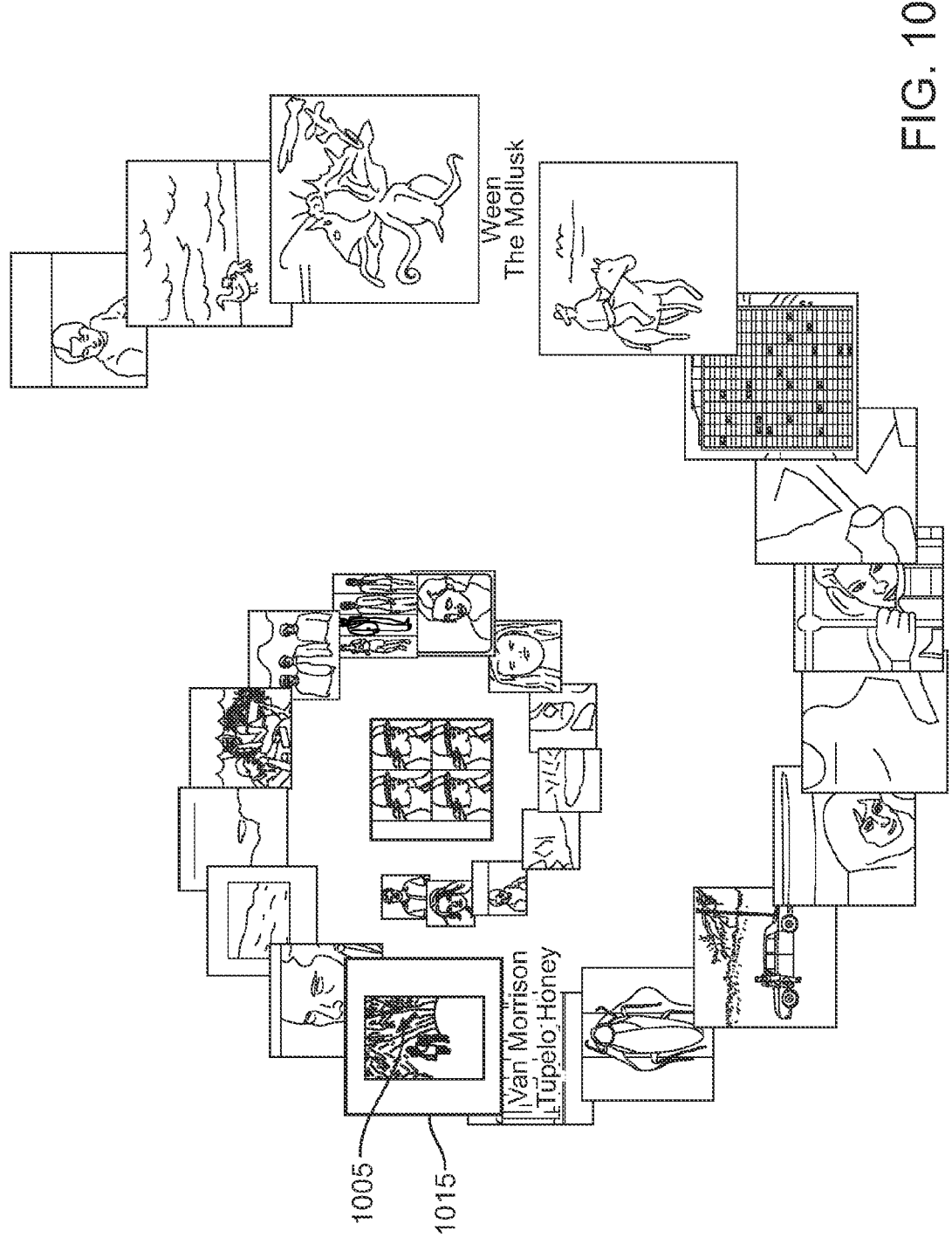
FIG. 10 illustrates a graphical user interface embodiment.
Figure 11:
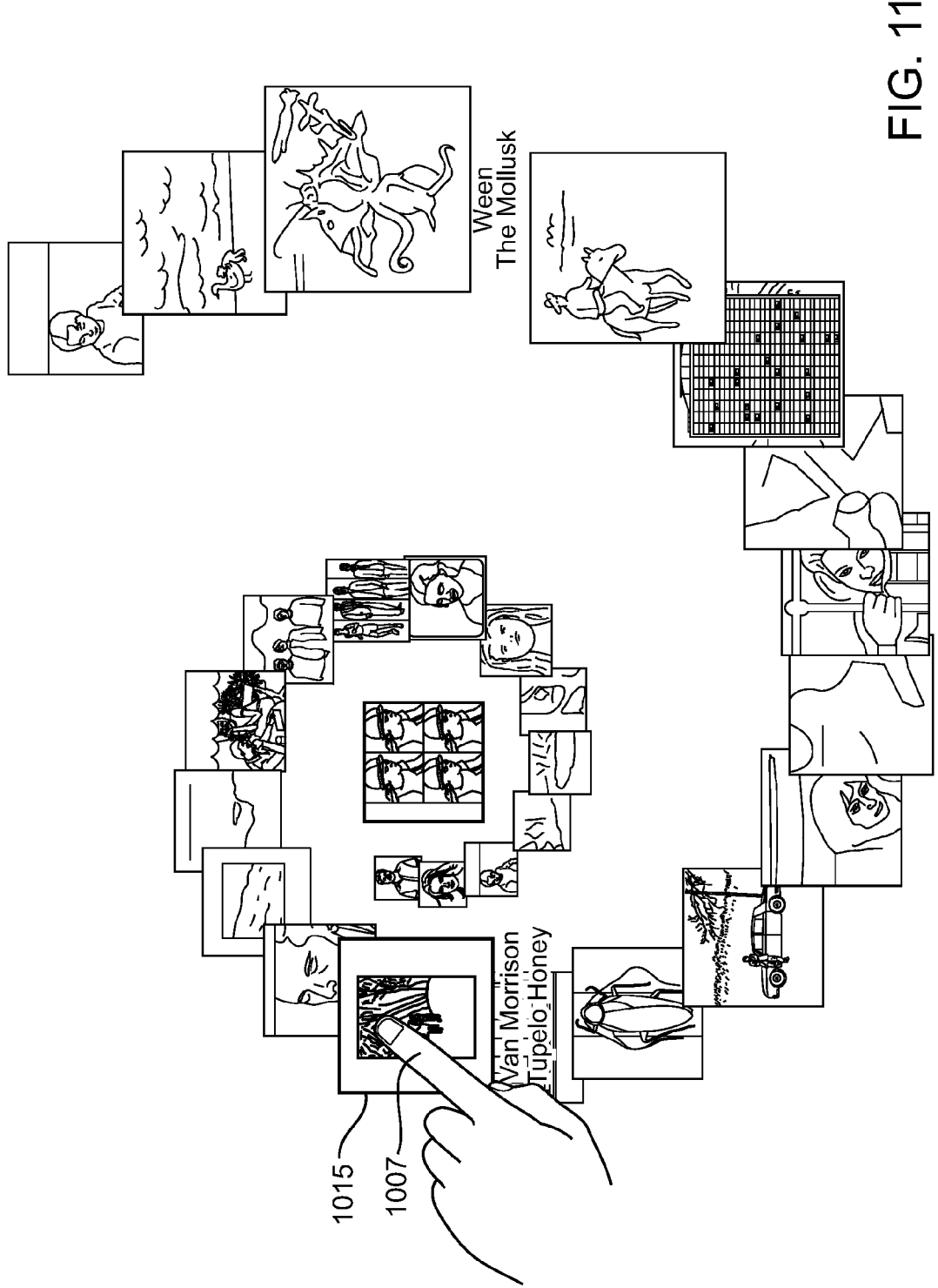
FIG. 11 illustrates a touch input embodiment of that shown in FIG. 10.
Figure 12:
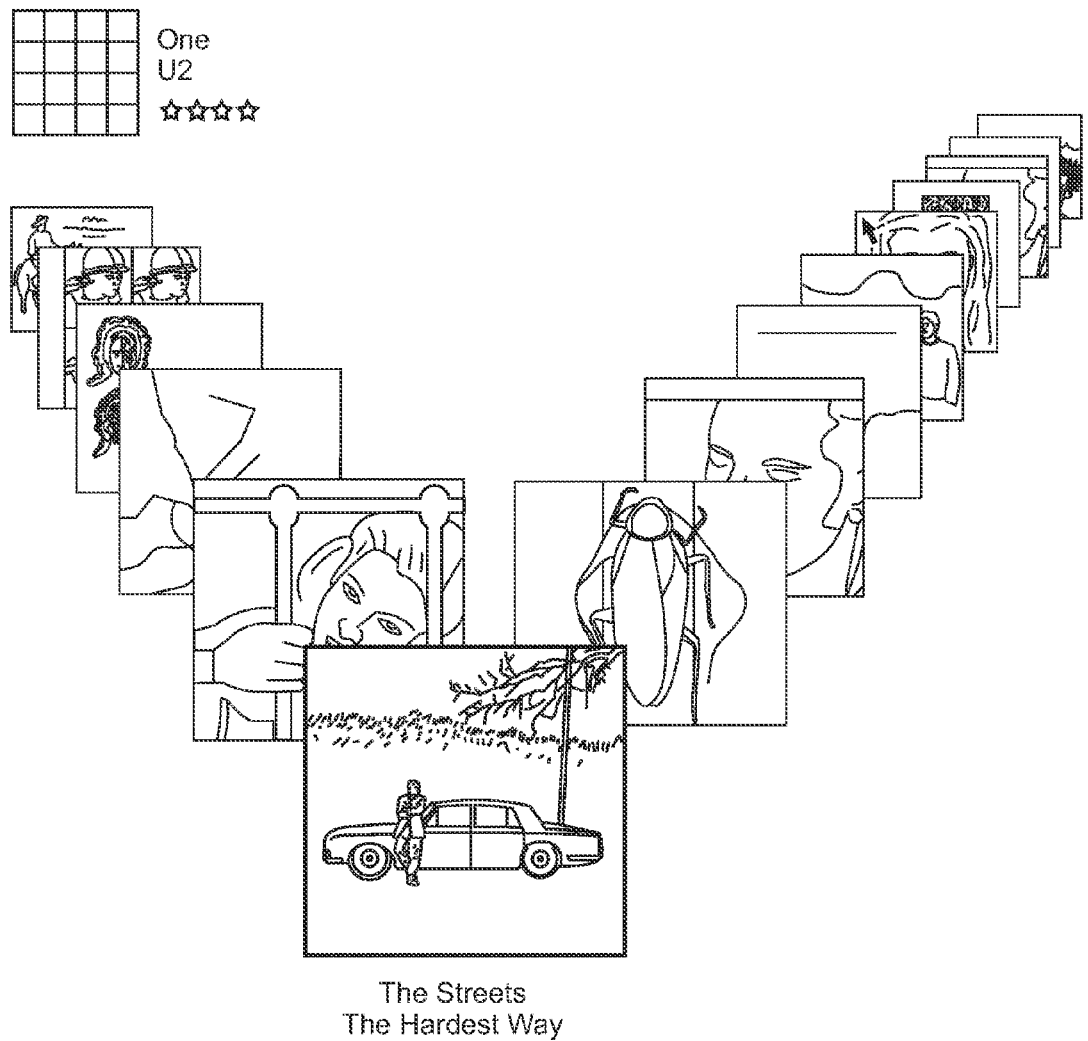
FIG. 12 illustrates a graphical user interface embodiment.

Returning to FIG. 9, if in step 912, the input focus position is over an item, hereafter called a mouse-over operation regardless of the type of input mechanism, that item is highlighted and its Z score is reduced to bring the item to the front in step 916. This is illustrated in FIGS. 10-11 wherein the input focus position, represented by pointer 1005 or finger 1007, respectively, is located over the icon 1015 representing a list item. As can be seen in FIGS. 10-11, icon 1015 has been enlarged and moved to the foreground to highlight the item. In some embodiments such as illustrated in FIG. 12, the mouse-over operation does not result in any enlargement or adjustment of Z-score. In some embodiments, the mouse-over operation results in head-up-display presenting information about the moused-over item in a static location such as in the center of the screen or at the bottom of the screen. Referring back to FIG. 9, if the input is not over any item, all items are displayed in their default view in step 914, i.e., no items are enlarged and highlighted, and the process returns to step 910.

If, however, the input is over the item as shown in FIGS. 10-11, the process moves to step 918 wherein a selection operation is detected. If the input is over an item but it is not selected, for example by clicking a mouse button or touch is released over the item or a touch tap, the process returns to step 910. But, if the item is selected by some selection operation the process proceeds to step 920 wherein a move operation is detected. If the selected item has been moved, its new location is detected in step 922.

Figure 13:
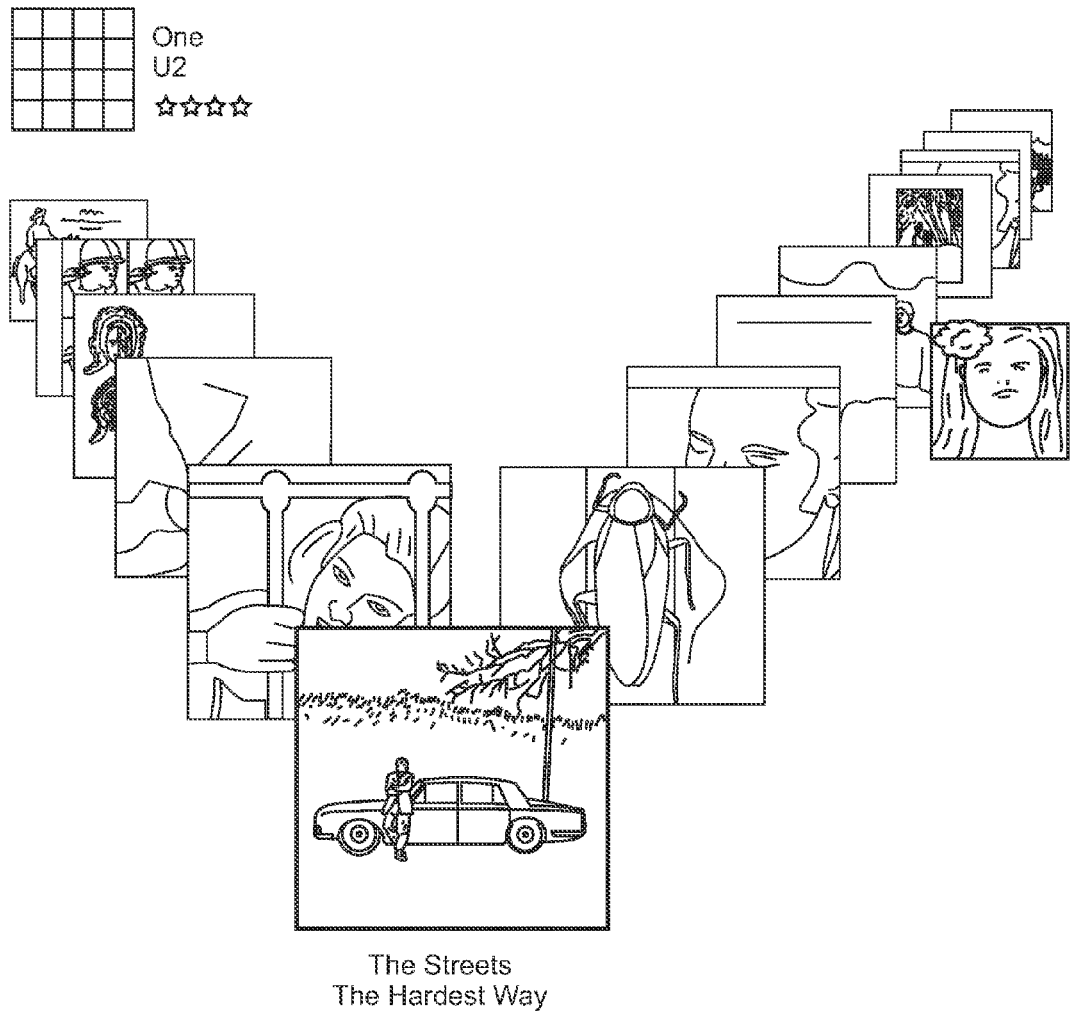
FIG. 13 illustrates a graphical user interface embodiment.

Different actions result depending on the new location of the item. If the selected item is determined to be outside the list as determined by query 924, the item represented by the icon is deleted from the list in step 926. This is illustrated in FIG. 13 wherein a cloud animation represents that the item is about to be deleted. If the selected item is now in a new location in the list as determined by query 928, the item representing the icon is moved to the corresponding position in the underlying list in step 930. If the selected icon is placed in the location of the generic icon representing the entire list as determined by query 932, the entire list is replaced by a new list built around the generic item in step 934. Example illustrations of these move operations can be seen at FIGS. 14-19.

Figure 14:
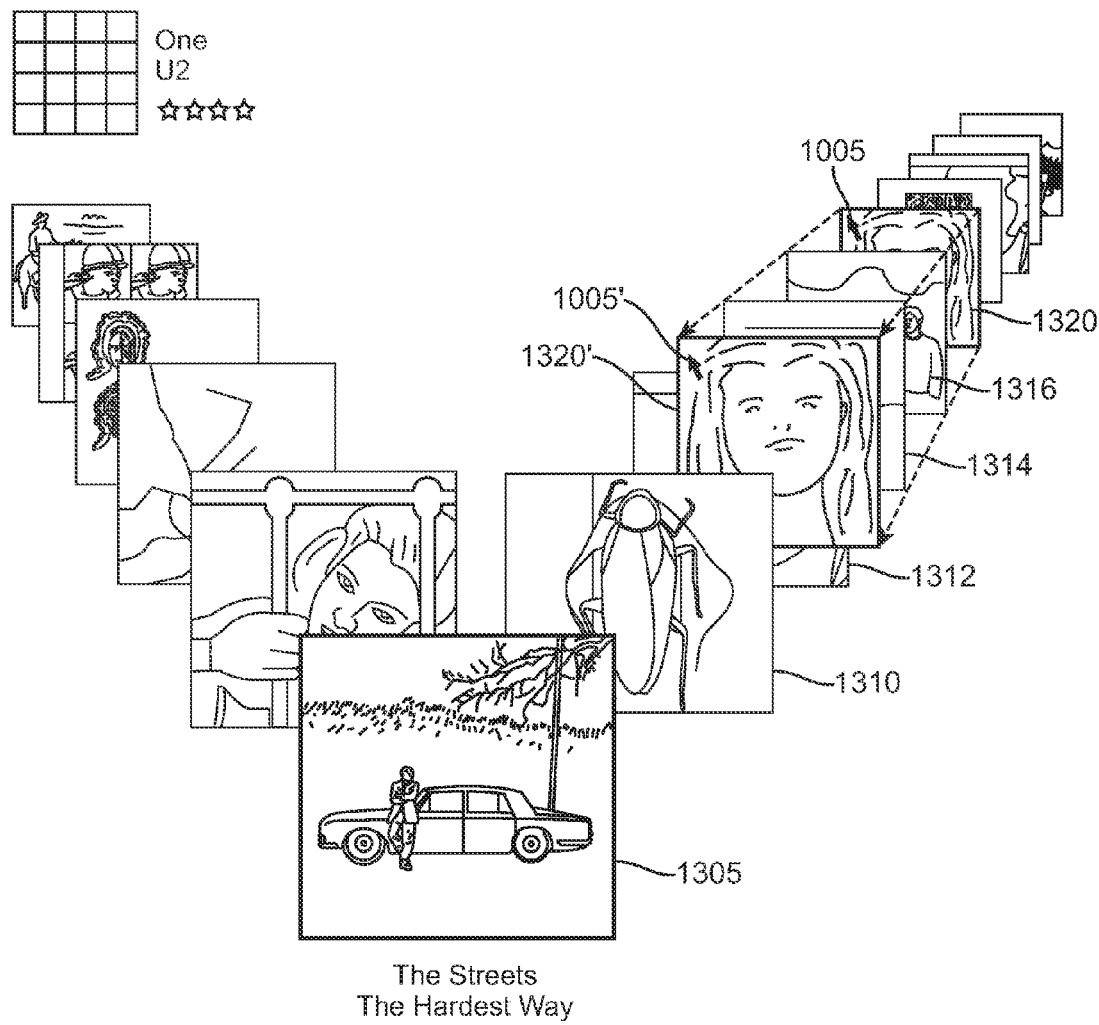
FIG. 14 illustrates a graphical user interface embodiment.
Figure 15:
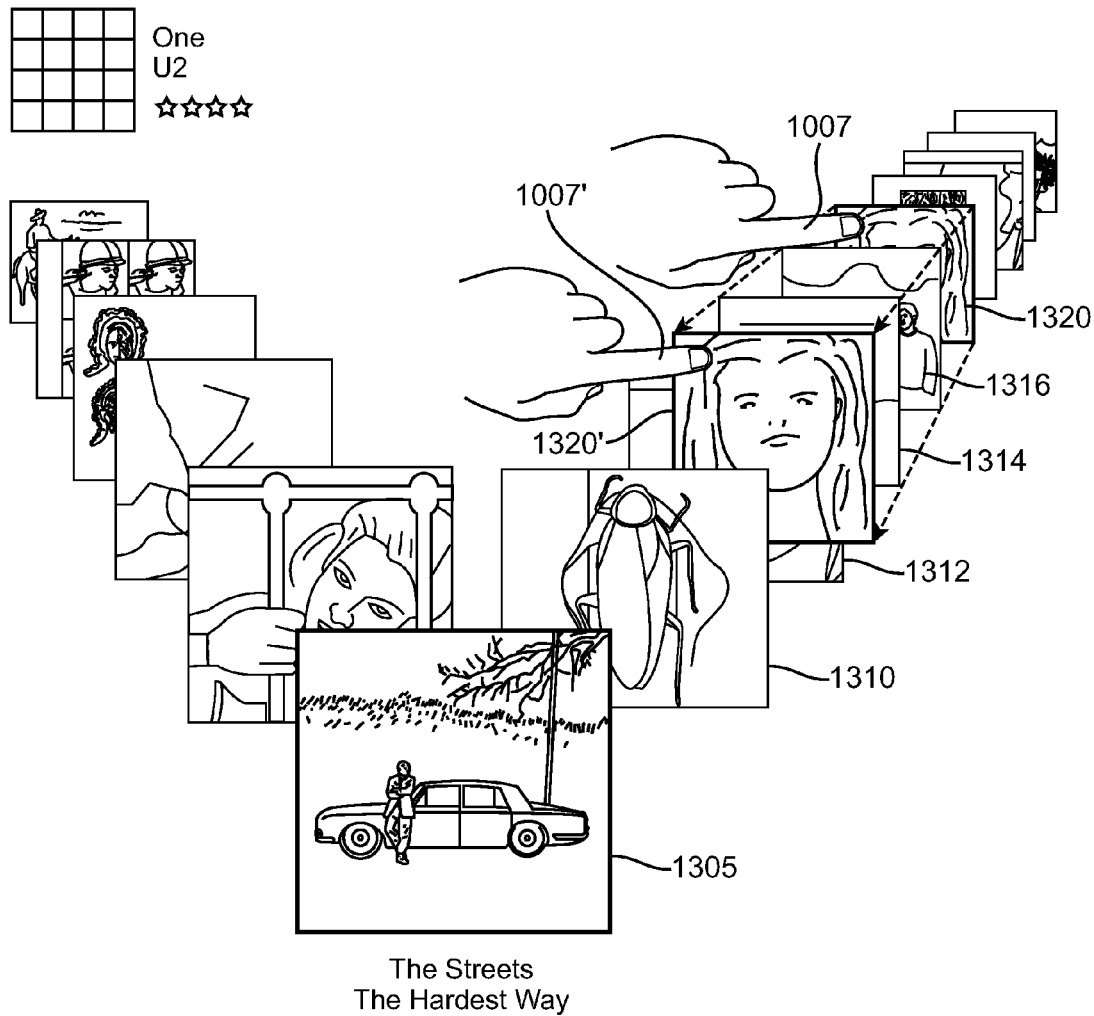
FIG. 15 illustrates a touch input embodiment of that shown in FIG. 14.

FIGS. 14-15 are illustrations of the v-shaped embodiment showing item 1320 among a list of items 1305, 1310, 1312, 1314, 1316, 1320. Item 1305 is currently playing and item 1320 will play after items 1310, 1312, 1314, and 1316, which precede item 1320 in the list. As shown, item 1320 is currently selected by pointer object 1005 or finger 1007. While in this embodiment, item 1320 is not in the foreground, in some embodiments selection can be indicated by moving the object into the foreground. Selected item 1320 is shown being dragged or otherwise moved to an earlier position in the list. Moved item 1320 is represented by item 1320' being manipulated by pointer object 1005' or finger 1007'. Once item 1320' is released by pointer object 1005' or finger 1007', the list underlying the displayed presentation will be reordered just as the visual representation of the list. Instead of the previous order, the list will be ordered as 1305, 1310, 1320, 1314, 1316.

As item 1320 is moved forward and advanced in the list, it appears in front of the items in which it has been advanced beyond. For example, even before being released by pointer object 1005' or finger 1007', 1320' has a higher Z-score than item 1310, but a lower Z-score that item 1314. In some embodiments the items it the list can also be animated to rearrange by snapping items to their new potential positions as item 1320' is transported to its new location.

Figure 16:
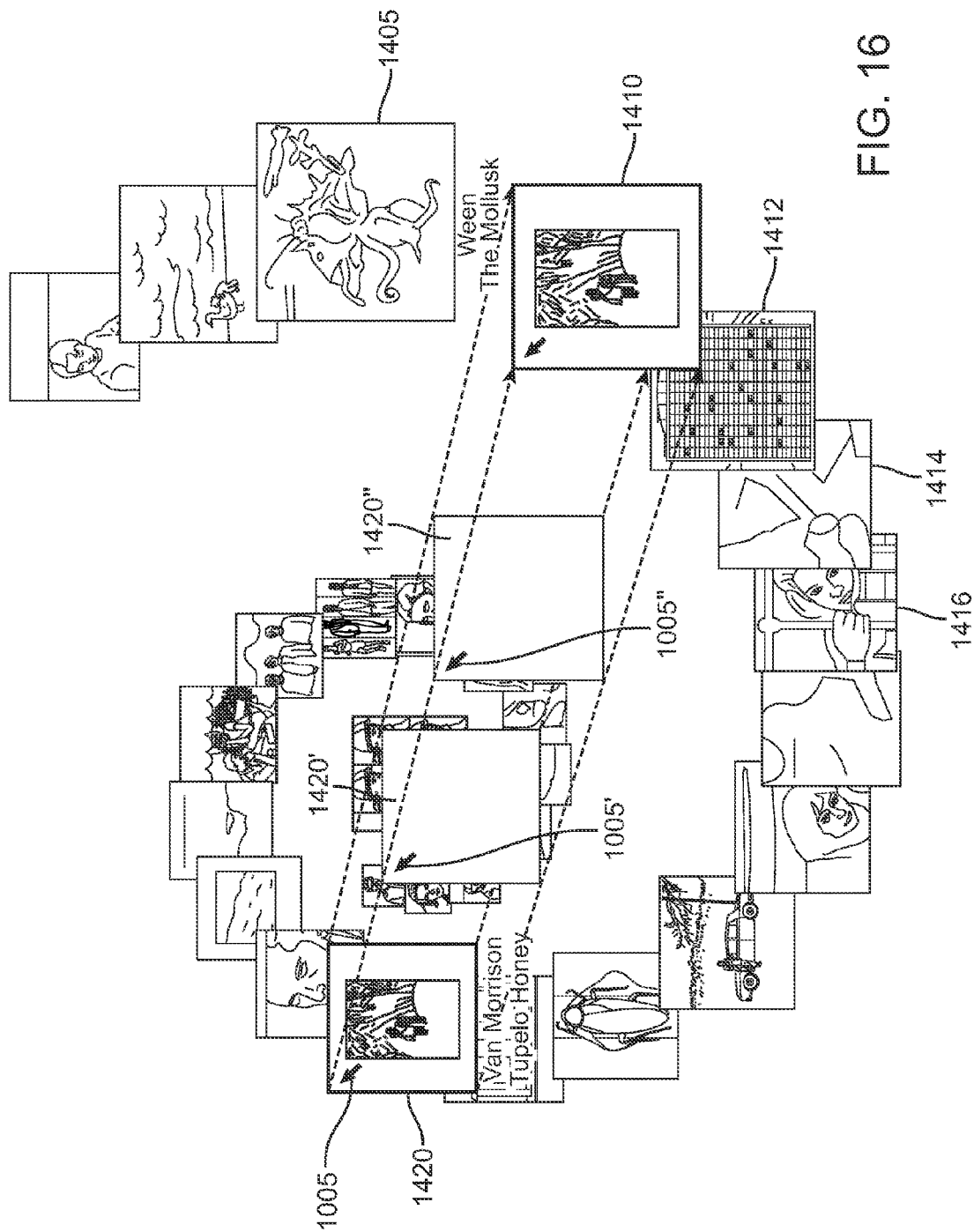
FIG. 16 illustrates a rearranging objects in a graphical user interface embodiment.

FIG. 16 illustrates a similar action but in a spiral embodiment. Item 1420 is shown selected by pointer object 1005, and in this embodiment, item 1420 is brought to the foreground to illustrate its selection. Item 1420 is shown during its move operation at two intermediate locations as 1420' and 1420" being manipulated by pointer object 1005' and 1005" respectively. Item 1420 is ultimately transported to the current location of item 1410, which is the next item to be played. By dragging item 1420 on top of item 1410, item 1420 displaces item 1410 and becomes the next item to be played.

Thus the new ordering of the list will become 1405 (currently playing), 1420, 1410, 1412, 1414, 1416.

Figure 17:
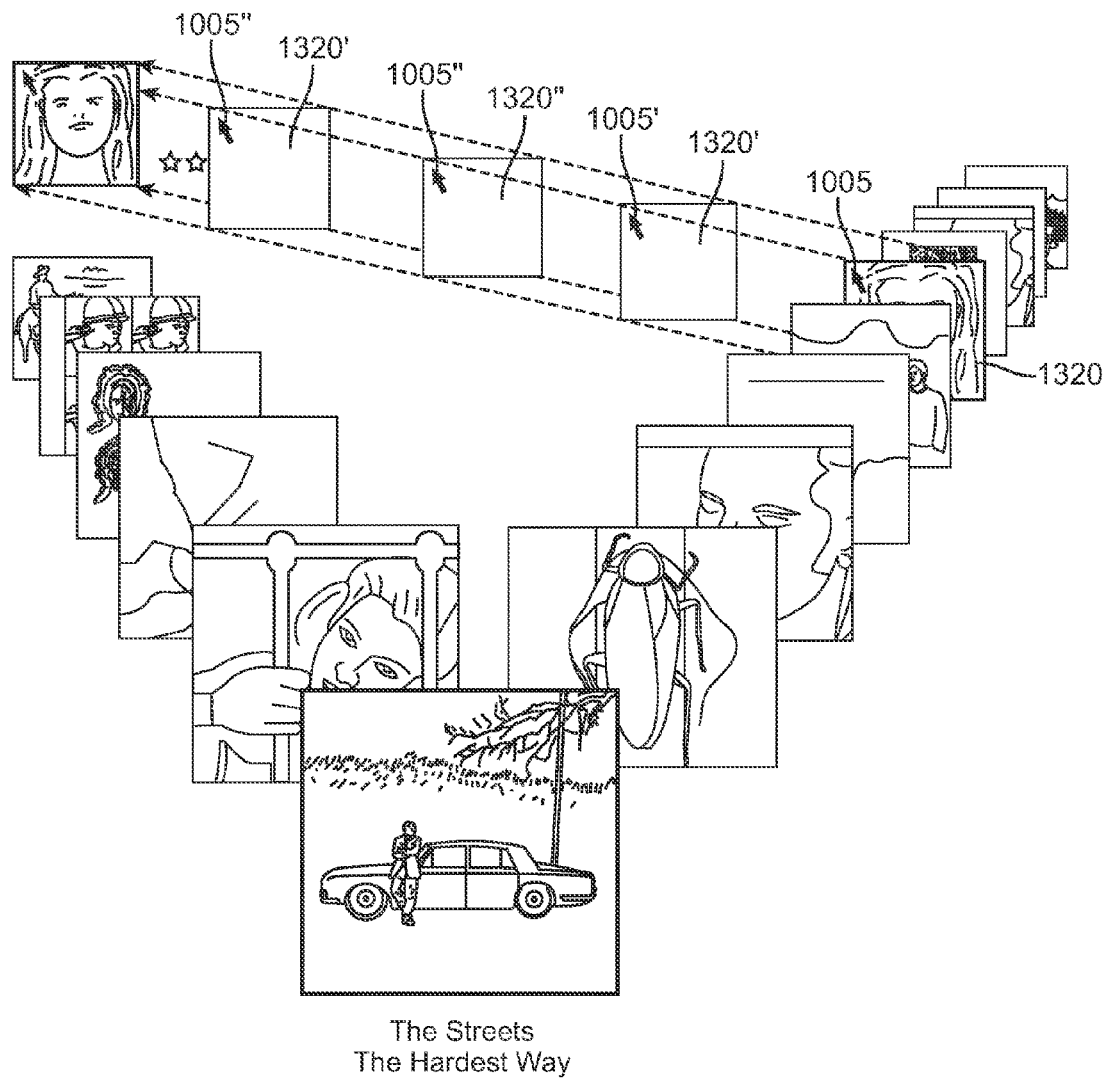
FIG. 17 illustrates a rearranging objects in a graphical user interface embodiment.
Figure 18:
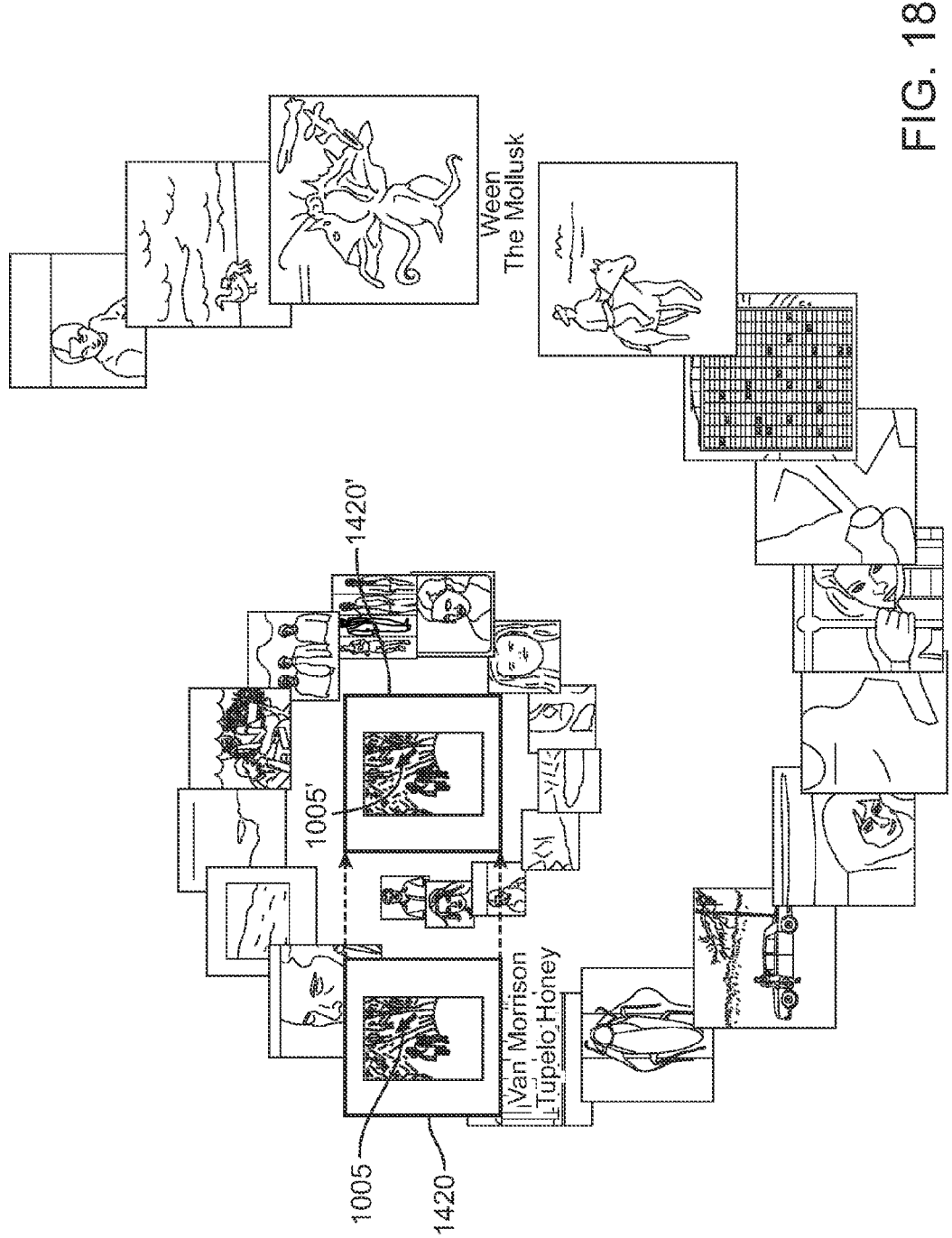
FIG. 18 illustrates a rearranging objects in a graphical user interface embodiment.
Figure 19:
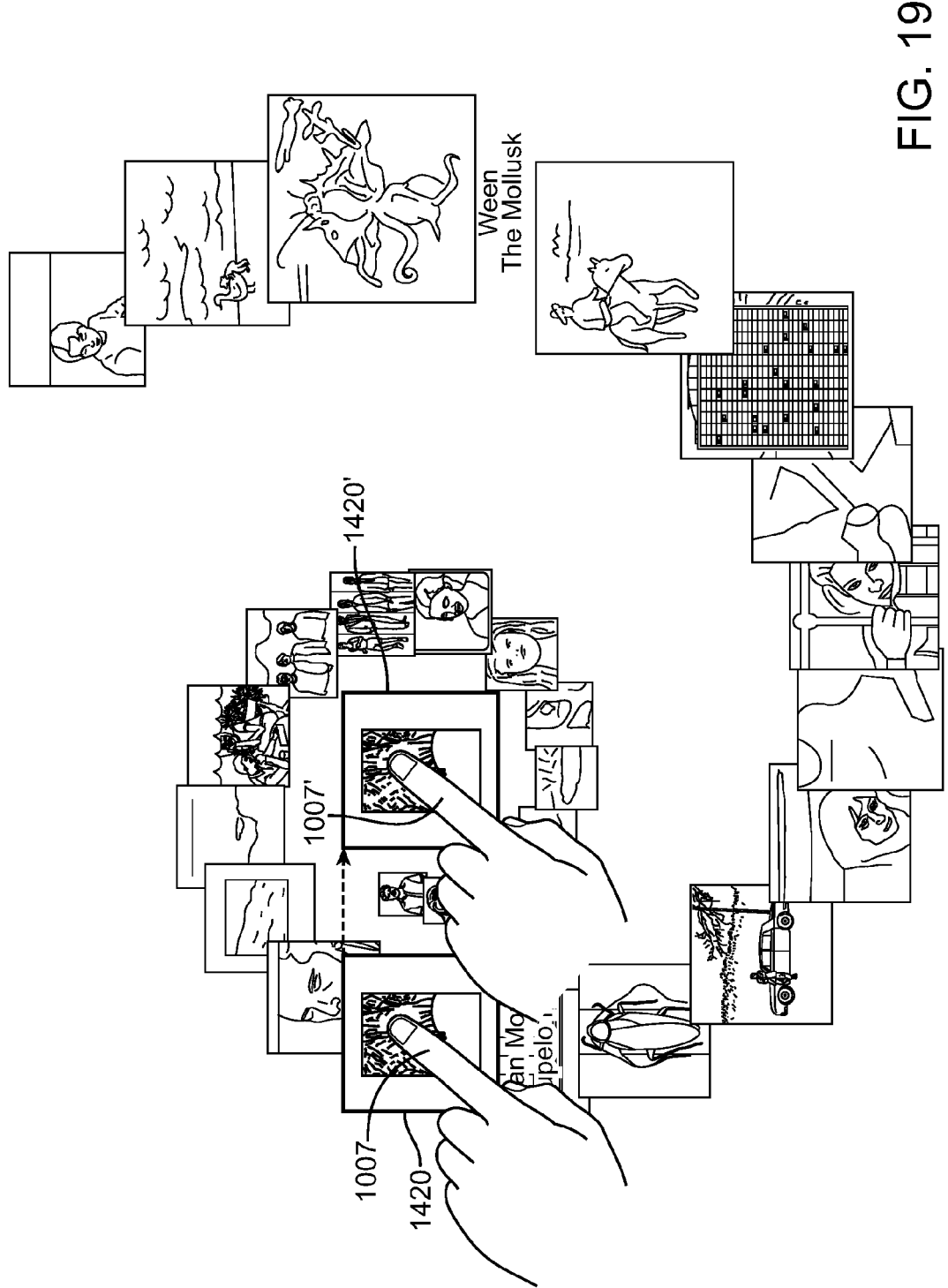
FIG. 19 illustrates a touch input embodiment of that shown in FIG. 18.

FIGS. 17, 18 and 19 illustrate replacing the generic icon with an item from the playlist. In FIG. 17, item 1320 is selected by pointer object 1005 and dragged to replace the generic icon. As described above, this action will result in the creation of a new playlist using item 1320 as a seed item. The drag operation is illustrated using items 1320', 1320", 1320'" under the control of items 1005', 1005" and 1005'" respectively which illustrate icon 1320 being dragged across the screen while continuing to be displayed.

Similarly, FIGS. 18-19 illustrate item 1420 being dragged by pointer object 1005 or finger 1007, respectively, which is illustrated by 1420' and 1005' or 1007' representing the movement of the item, to replace the generic icon at the center of the spiral. Once item 1420 is released by the pointer object or finger, a new list can be created using item 1420 as a seed item.

Figure 20:
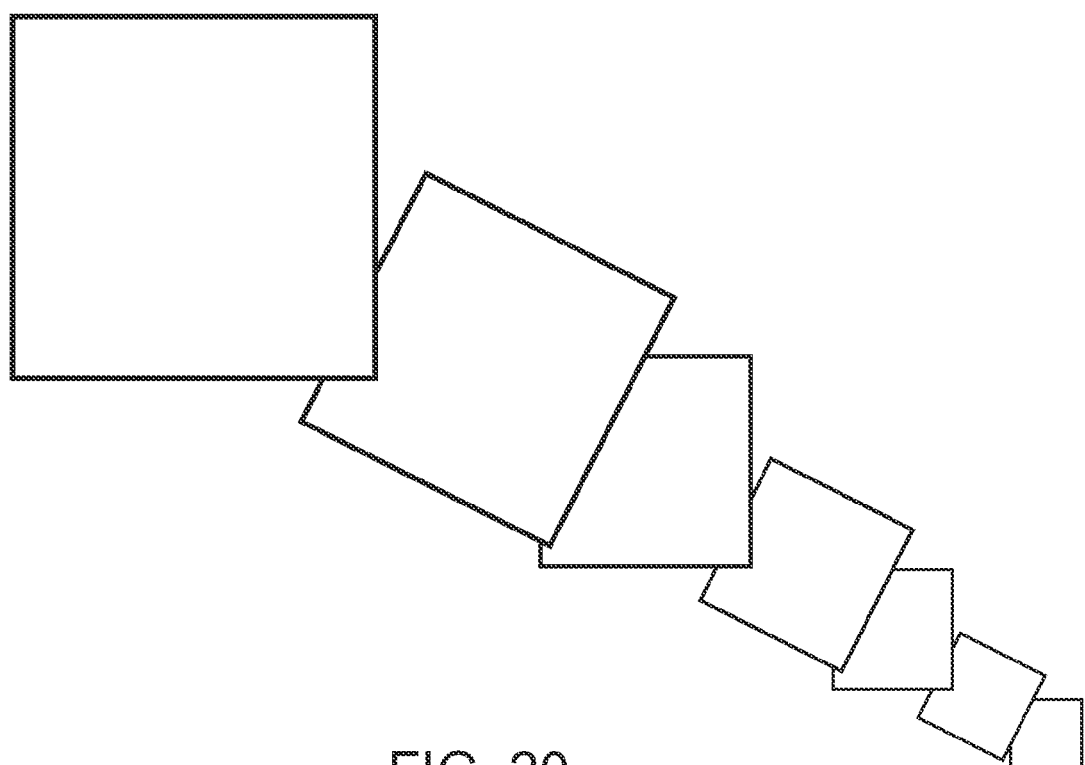
FIG. 20 illustrates a rearranging objects in a graphical user interface embodiment.
Figure 21:
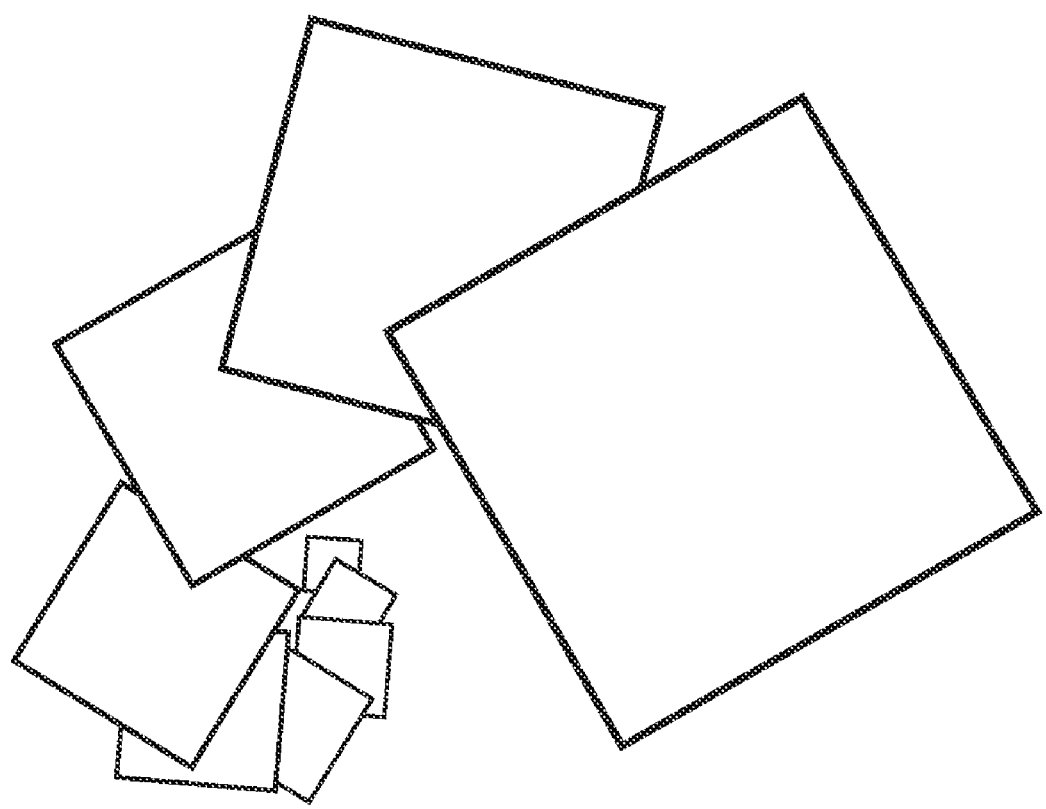
FIG. 21 illustrates a graphical user interface embodiment.
Figure 22:
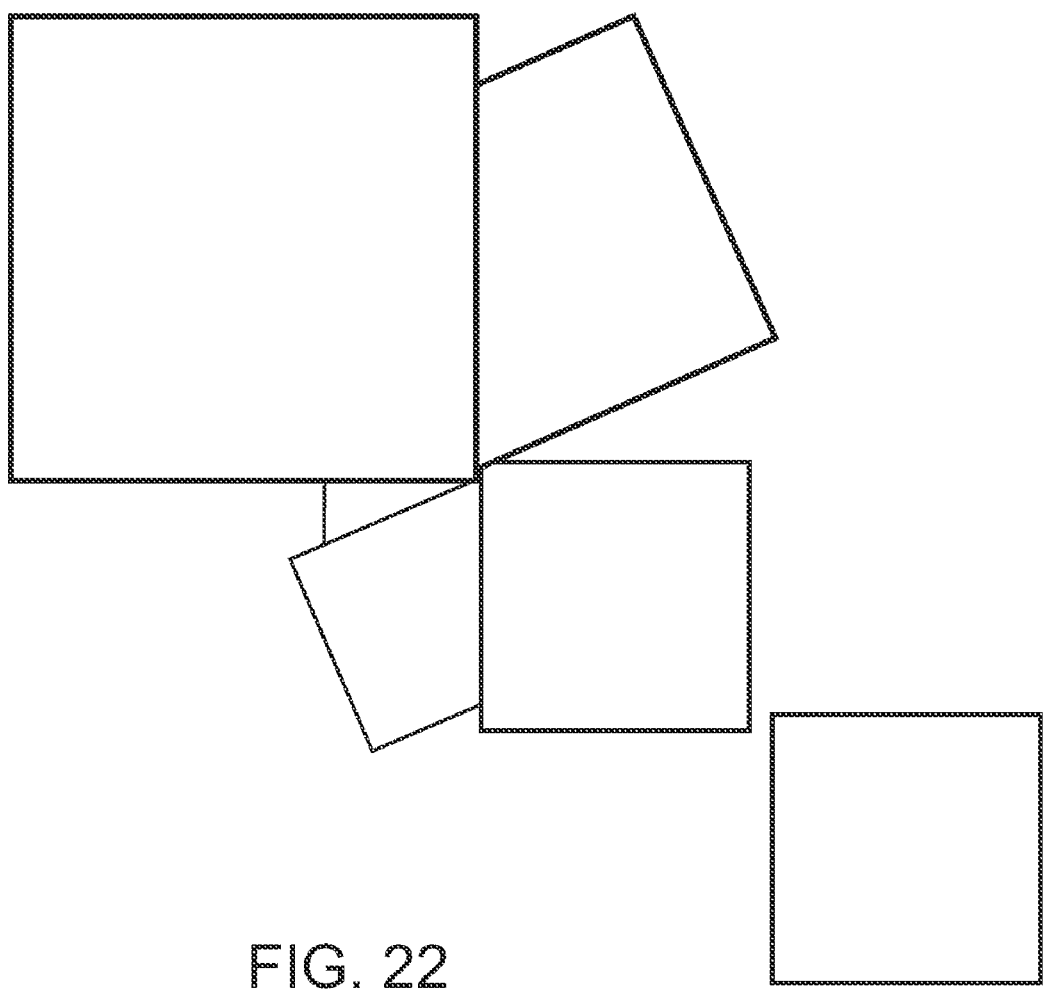
FIG. 22 illustrates a graphical user interface embodiment.
Figure 23:
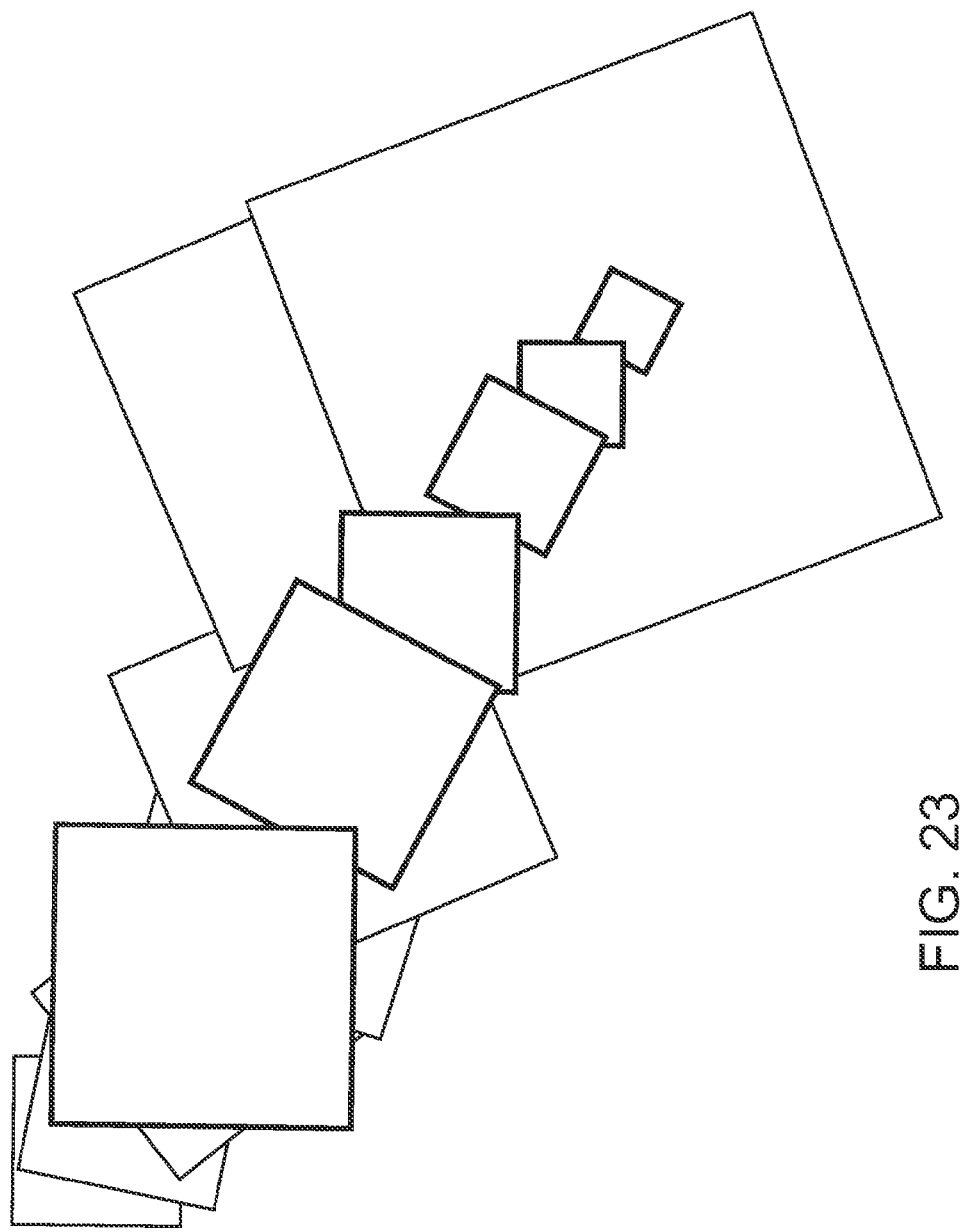
FIG. 23 illustrates a graphical user interface embodiment.

As mentioned above many shapes and configurations are possible for use with the methods described above. FIGS. 20-23 are just some other potential embodiments that are consistent with above descriptions. For example, FIG. 20 illustrates a substantially linear pattern of icons representing files in a list. FIG. 21 illustrates a tight spiral pattern of icon representing files in a list. FIG. 22 represents a tight spiral pattern with an icon that represents the entire playlist off to the side. FIG. 23, like FIG. 20 illustrates a substantially linear pattern of icons with additionally background features. The background can be a simple background, or it can be functional. It can display previously played items or icons that represent the entire playlist.

While throughout the above description the technology has been described as pertaining to music, any media item can be used with this system. It is fully contemplated herein to be able to create and remotely manage lists containing any number of different media types such as, but not limited to, video, movies, still images, or any other file or combination of files that can be joined to a playlist. Accordingly, music as it is mentioned above should be considered as no more than an embodiment of the presently described system and method. Similarly, while in some embodiments a pointer or a finger is illustrated, this too should not be considered limiting and in these embodiments a pointer controlled by a mouse of or a finger providing inputs into a touch interface can be used.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such tangible computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the tangible computer-readable media.

Computer-executable instructions include, for example, instructions and data which cause a general purpose computer, special purpose computer, or special purpose processing device to perform a certain function or group of functions.

Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules can provide examples of program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present disclosure.

We claim:

1. A method of playlist manipulation implemented on a machine that includes at least one processing device, the method comprising:
    implementing at least one of the following via said at least one processor:
    providing a graphical user interface in the form of a receding spiral made up of a collection of icons, each icon representing a media item in a playlist, wherein the collection of icons in the receding spiral update their position and size in the receding spiral when an active media item changes such that a first set of icons representing yet-to-be-played media items are unwound, a second set of icons representing previously-played media items are wound, and an icon representing the active media item remains in approximately a constant location of the receding spiral;
    providing an icon in a center region of the receding spiral representing the playlist;
    receiving an input representative of dragging a representation of a media item or playlist into the center region of the receding spiral;
    generating a new playlist based on the received input; and
    displaying a new receding spiral based on the new playlist.

2. The method of claim 1, wherein the new receding spiral is generated based on a playlist created using similarity data related to the new media item in the center region of the receding spiral, the media items in the playlist are considered similar to the new media item.

3. The method of claim 1, wherein at least one of the icons representing the media items in the playlist are derived from album art.

4. The method of claim 2, wherein the icon in the center region of the receding spiral is derived from album art when the playlist is generated based on a media item.

5. The method of claim 1, wherein the icon in the center region of the receding spiral is a generic icon representing a playlist.

6. A machine implemented method a manipulating a playlist comprising:
    implementing at least one of the following via said at least one processor:
    providing a graphical user interface in the form of a receding spiral made up of a collection of icons, each icon representing a media item in a playlist, wherein the collection of icons in the receding spiral update their position and size in the receding spiral when an active media item changes such that a first set of icons representing yet-to-be-played media items are unwound, a second set of icons representing previously-played media items are wound, and an icon representing the active media item remains in approximately a constant location of the receding spiral;
    providing an icon in a central region of the spiral representing the playlist;
    receiving an input representative of a selection and movement, to a new position, of an icon representing a media item in the playlist; and
    reproducing the playlist according to the new position of the icon and responsively updating the graphical user interface based on the rearranged playlist.

7. The method of claim 6, wherein a media item is removed from the playlist by receiving inputs representative of a selection and movement of a media item out of the spiral.

8. The method of claim 6, wherein a new playlist is represented by the spiral when an icon representing a media item or playlist is selected and relocated to the central region of the spiral.

9. The method of claim 6, further comprising: emphasizing a specific icon of the collection of icons in response to a cursor being positioned over the specific icon.

10. The method of claim 9, wherein the specific icon is emphasized by bringing the icon into a foreground.

11. The method of claim 9, wherein the specific icon is emphasized by enlarging the icon.

12. A computer-readable medium comprising computer program code causing a device to perform a method comprising:
    mapping graphical representations of at least some items in a playlist to locations on a virtual display wherein the collective graphical representations of the items comprises a receding spiral, wherein the graphical representation of the items in the receding spiral update their position and size in the receding spiral when an active media item changes such that a first set of icons representing yet-to-be-played media items are unwound, a second set of icons representing previously-played media items are wound, and an icon representing the active media item remains in approximately a constant location of the receding spiral;
    displaying the contents of the virtual display on a display device;
    detecting a selection action representative of selecting one of the graphical representations;
    detecting a move action representative of relocating the position of the selected graphical representation;

displaying the graphical representation throughout the move action, whereby the potential new order of the playlist is displayed;

reordering the playlist based on the relocated position of the selected graphical representation;

providing an icon in a center region of the receding spiral representing the entire playlist;

receiving an input representative of a dragging a representation of a media item or playlist into the center region of the receding spiral;

generating a new playlist based on the received input; and displaying a new receding spiral based on the new playlist.

13. The computer-readable medium of claim 12, wherein the move action caused relocation of a graphical representation of a media item that is outside of the spiral into the spiral and the reordering comprises incorporating the media item into the playlist represented by the spiral.

14. The computer-readable medium of claim 13, wherein the move action is representative of moving the media item from a directory folder.

15. The computer-readable medium of claim 13, wherein the move action is representative of moving the media item from a media management graphical user interface.

16. A method for managing a list in a graphical user interface comprising:
implementing at least one of the following via said at least one processor:
generating a relative ordering for a list of digital files;
displaying a graphical user interface comprising respective graphical icons for each digital file, the respective graphical icons positioned for maintaining the relative ordering, and collectively producing a spiral pattern;
graphically distinguishing, on the display, the icon for a currently selected digital file;
updating the spiral pattern based on changes of the currently selected digital file to maintain each then-currently selected digital file in approximately a constant location, while previously currently selected digital files are segregated from to-be-selected digital files by the icon for the currently selected digital file, wherein a first set of the graphical icons representing the previously currently selected digital files are wound and a second set of graphical icons representing the yet-to-be-selected digital files are unwound when the currently selected digital file changes to a next digital file in the ordered list;
accepting digital file sequence manipulation input from the graphical user interface;
based on the sequence manipulation input, generating a different ordering for the list of digital files;
providing an icon in a center region of the receding spiral representing the entire playlist;
receiving an input representative of a dragging a representation of a media item or playlist into the center region of the receding spiral;
generating a new playlist based on the received input; and
displaying a new receding spiral based on the new playlist.

17. The method of claim 16, wherein the step of updating includes an animation sequence to illustrate the change in the currently selected digital file.

18. The method of claim 17, wherein the animation illustrates the spiral rotating the new currently selected digital file into the approximately constant location designated for the currently selected file.

19. The method of claim 16, wherein a new digital file is inserted into the list by inserting a graphical representation of a new digital file into the spiral pattern.

20. The method of claim 19, wherein the new digital file is inserted into the list in the same relative position as the position that the graphical representation of the new digital file was inserted into the spiral relative to the other files already in the list.

21. The method of claim 16, wherein the new list is created based on similarity data associated with the new digital file.

22. The method of claim 16, wherein the graphical representation of the new digital file is selected from outside of the spiral.

23. The method of claim 16, wherein the graphical representation of the new digital file is selected from one of the items already within the spiral.

24. The method of claim 9, wherein the specific icon is emphasized by displaying information associated with the icon in a heads-up-display.

25. The method of claim 1, wherein the icon representing the active media item appears in the foreground and the icons representing other media items in the playlist recede to the background in accordance to the proximity of each media item to the active media item in the playlist.

26. The method of claim 1, wherein the icon representing the active media item separates the first set of icons and the second set of icons.

27. The method of claim 1, wherein another icon representing a previously-played media item becomes smaller as the active media item changes.

28. The method of claim 1, wherein another icon representing a to-be-played media item becomes larger as the active media item changes.

29. The machine implemented method of claim 6, wherein the icon representing the active media item appears in the foreground and the icons representing other media items in the playlist recede to the background in accordance to the proximity of each media item to the active media item in the playlist.

30. The machine implemented method of claim 6, wherein the icon representing the active media item separates the first set of icons and the second set of icons.

31. The method of claim 6, wherein another icon representing a previously-played media item becomes smaller as the active media changes.

32. The method of claim 6, wherein another icon representing a to-be-played media item becomes larger as the active media item changes.

33. The non-transitory computer-readable medium of claim 12, wherein the icon representing the active media item appears in the foreground and the icons representing other media items in the playlist recede to the background in accordance to the proximity of each media item to the active media item in the playlist.

34. The non-transitory computer readable of claim 12, wherein the icon representing the active media item separates the first set of icons and the second set of icons.

35. The method of claim 16, wherein the icon representing the currently selected digital file appears in the foreground and the icons representing other media items in the playlist recede to the background in accordance to the proximity of each media item to the active media item in the playlist.

* * * * *